US009996616B2

(12) United States Patent
Grant et al.

(10) Patent No.: US 9,996,616 B2
(45) Date of Patent: Jun. 12, 2018

(54) METHODS AND SYSTEMS FOR SEARCHING, SELECTING, AND DISPLAYING CONTENT

(71) Applicant: MEDIASHIFT ACQUISITION, INC., Glendale, CA (US)

(72) Inventors: David S. Grant, Mission Viejo, CA (US); John W. Grant, Bellflower, CA (US); Sanjeev Kuwadekar, Northridge, CA (US)

(*) Notice: Subject to any disclaimer, the term of this patent is extended or adjusted under 35 U.S.C. 154(b) by 393 days.

(21) Appl. No.: 14/540,877

(22) Filed: Nov. 13, 2014

(65) Prior Publication Data

US 2015/0294000 A1    Oct. 15, 2015

Related U.S. Application Data

(63) Continuation of application No. 12/728,037, filed on Mar. 19, 2010, now Pat. No. 8,898,161.
(Continued)

(51) Int. Cl.
*G06F 17/30* (2006.01)
*G06Q 20/10* (2012.01)
(Continued)

(52) U.S. Cl.
CPC .. *G06F 17/30864* (2013.01); *G06F 17/30867* (2013.01); *G06F 17/30882* (2013.01);
(Continued)

(58) Field of Classification Search
None
See application file for complete search history.

(56) References Cited

U.S. PATENT DOCUMENTS 6,182,085 B1    1/2001    Eichstaedt et al.
6,185,598 B1    2/2001    Farber et al.
(Continued)

FOREIGN PATENT DOCUMENTS

CN    101179701    5/2008
CN    101321138    12/2008
(Continued)

OTHER PUBLICATIONS

Office Action in U.S. Appl. No. 13/836,672, dated Jan. 6, 2015.
(Continued)

*Primary Examiner* — Belix M Ortiz Ditren
(74) *Attorney, Agent, or Firm* — John L Sotomayor

(57) ABSTRACT

Methods and systems for identifying and presenting information are described. Search results are received from a search engine. An entity associated with a networked site is selected using a selection criterion. A determination is made as to whether the listing includes a link to the networked site or includes the link to the networked site at a list position that fails to satisfy a first criterion. After determining that the link to the site associated with the entity is not included in the search result listing, or that the link to the site associated with the entity is not at a position in the search result listing that satisfies the first criterion, the search listing is modified by causing the link to the site associated with the entity to appear in a first position in the search listing. The modified search listing is displayed on a user terminal.

19 Claims, 14 Drawing Sheets

Related U.S. Application Data

(60) Provisional application No. 61/161,944, filed on Mar. 20, 2009, provisional application No. 61/292,093, filed on Jan. 4, 2010.

(51) Int. Cl.
*G06Q 30/02* (2012.01)
*G06Q 30/00* (2012.01)

(52) U.S. Cl.
CPC ............ *G06Q 20/10* (2013.01); *G06Q 30/01* (2013.01); *G06Q 30/0215* (2013.01); *G06Q 30/0239* (2013.01); *G06Q 30/0241* (2013.01); *G06Q 30/0269* (2013.01); *G06Q 30/0277* (2013.01); *G06Q 30/0282* (2013.01)

(56) References Cited

U.S. PATENT DOCUMENTS

| | | | |
|---|---|---|---|
| 6,212,545 B1 | 4/2001 | Ohtani et al. | |
| 6,389,588 B1 | 5/2002 | Wadhwa et al. | |
| 6,601,061 B1 | 7/2003 | Holt et al. | |
| 6,889,254 B1 | 5/2005 | Chandra et al. | |
| 7,007,275 B1 | 2/2006 | Hanson et al. | |
| 7,299,219 B2 | 11/2007 | Green et al. | |
| 7,360,160 B2 | 4/2008 | Matz | |
| 7,660,917 B2 | 2/2010 | Freking et al. | |
| 7,685,296 B2 | 3/2010 | Brill et al. | |
| 7,693,830 B2 | 4/2010 | Guha | |
| 7,707,124 B2 | 4/2010 | Ryan, Jr. | |
| 7,707,224 B2 | 4/2010 | Chastagnol et al. | |
| 7,734,801 B2 | 6/2010 | Kushalnagar et al. | |
| 7,825,835 B2 | 11/2010 | Radhakrishnan | |
| 7,895,523 B2 | 2/2011 | Stockton | |
| 7,908,262 B2 | 3/2011 | Agranoff et al. | |
| 7,949,565 B1 | 5/2011 | Elderine et al. | |
| 7,949,791 B2 | 5/2011 | Serena | |
| 7,975,019 B1 | 7/2011 | Green et al. | |
| 8,190,986 B2 | 5/2012 | Alles et al. | |
| 8,219,549 B2 | 7/2012 | Gao et al. | |
| 8,234,275 B2 | 7/2012 | Grant et al. | |
| 8,249,497 B2 | 8/2012 | Ingrassia et al. | |
| 8,249,918 B1 | 8/2012 | Biere et al. | |
| 8,271,488 B2 | 9/2012 | Murashige et al. | |
| 8,386,321 B2 | 2/2013 | Grant et al. | |
| 8,554,630 B2 | 10/2013 | Grant et al. | |
| 8,898,161 B2 | 11/2014 | Grant et al. | |
| 2002/0010757 A1* | 1/2002 | Granik ............ G06F 17/30876 709/218 |
| 2002/0107735 A1 | 8/2002 | Henkin et al. | |
| 2002/0112002 A1 | 8/2002 | Abato | |
| 2003/0227487 A1 | 12/2003 | Hugh | |
| 2004/0068486 A1 | 4/2004 | Chidlovskii | |
| 2004/0249947 A1 | 12/2004 | Novaes et al. | |
| 2004/0267943 A1 | 12/2004 | Ryu | |
| 2005/0010475 A1 | 1/2005 | Perkowski et al. | |
| 2005/0021862 A1 | 1/2005 | Schroeder et al. | |
| 2005/0033641 A1 | 2/2005 | Jha et al. | |
| 2005/0033849 A1 | 2/2005 | Matz | |
| 2005/0055644 A1 | 3/2005 | Stockton | |
| 2005/0060311 A1 | 3/2005 | Tong et al. | |
| 2005/0102177 A1 | 5/2005 | Takayama | |
| 2005/0198116 A1 | 9/2005 | Appleman et al. | |
| 2006/0080239 A1 | 4/2006 | Hartog | |
| 2007/0011155 A1 | 1/2007 | Sarkar | |
| 2007/0016477 A1 | 1/2007 | Yang et al. | |
| 2007/0106803 A1 | 5/2007 | Peterson et al. | |
| 2007/0136742 A1 | 6/2007 | Sparrell | |
| 2007/0146812 A1 | 6/2007 | Lawton | |
| 2007/0192314 A1 | 8/2007 | Heggem | |
| 2007/0204223 A1 | 8/2007 | Bartels et al. | |
| 2007/0239528 A1 | 10/2007 | Xie et al. | |
| 2007/0276810 A1 | 11/2007 | Rosen | |
| 2007/0276812 A1 | 11/2007 | Rosen | |
| 2008/0071766 A1 | 3/2008 | Grieselhuber et al. | |
| 2008/0082381 A1 | 4/2008 | Muller et al. | |
| 2008/0082417 A1 | 4/2008 | Publicover | |
| 2008/0103971 A1 | 5/2008 | Lukose et al. | |
| 2008/0109553 A1 | 5/2008 | Fowler | |
| 2008/0162475 A1 | 7/2008 | Meggs et al. | |
| 2008/0177689 A1 | 7/2008 | Jeng et al. | |
| 2008/0183573 A1 | 7/2008 | Muschetto | |
| 2008/0208817 A1 | 8/2008 | Allsop et al. | |
| 2008/0214149 A1 | 9/2008 | Ramer et al. | |
| 2008/0235671 A1 | 9/2008 | Kellog et al. | |
| 2008/0270521 A1 | 10/2008 | Shen et al. | |
| 2008/0306816 A1 | 12/2008 | Matthys et al. | |
| 2008/0319862 A1 | 12/2008 | Golan et al. | |
| 2009/0025026 A1 | 1/2009 | Mick, Jr. et al. | |
| 2009/0037412 A1 | 2/2009 | Bard et al. | |
| 2009/0077071 A1 | 3/2009 | Mishkanian et al. | |
| 2009/0083142 A1 | 3/2009 | Keswani et al. | |
| 2009/0106100 A1 | 4/2009 | Mashinsky | |
| 2009/0119165 A1 | 5/2009 | Cotgreave | |
| 2009/0158133 A1 | 6/2009 | Serena | |
| 2009/0222394 A1 | 9/2009 | Brelage et al. | |
| 2009/0265317 A1 | 10/2009 | Buehrer et al. | |
| 2009/0300594 A1 | 12/2009 | Kozhukh | |
| 2010/0005488 A1 | 1/2010 | Rakib et al. | |
| 2010/0010884 A1 | 1/2010 | Cohee et al. | |
| 2010/0030734 A1 | 2/2010 | Chunilal | |
| 2010/0031136 A1 | 2/2010 | Chen et al. | |
| 2010/0169655 A1 | 7/2010 | Chastagnol et al. | |
| 2010/0185600 A1 | 7/2010 | Shin et al. | |
| 2010/0223126 A1 | 9/2010 | Tung et al. | |
| 2011/0058675 A1 | 3/2011 | Brueck et al. | |
| 2011/0082848 A1 | 4/2011 | Goldentouch | |
| 2011/0119298 A1 | 5/2011 | Arrasvuori et al. | |
| 2011/0161316 A1 | 6/2011 | Jeh et al. | |
| 2011/0264498 A1 | 10/2011 | Grant et al. | |
| 2011/0307921 A1 | 12/2011 | Zenoni | |
| 2012/0117649 A1 | 5/2012 | Holloway et al. | |
| 2012/0144291 A1 | 6/2012 | Chang et al. | |
| 2013/0031566 A1 | 1/2013 | Sureshan et al. | |
| 2013/0276024 A1 | 10/2013 | Grant et al. | |
| 2013/0311301 A1 | 11/2013 | Grant et al. | |
| 2014/0164351 A1 | 6/2014 | Grant et al. | |
| 2015/0012363 A1 | 1/2015 | Grant et al. | |
| 2015/0019350 A1 | 1/2015 | Grant et al. | |
| 2015/0019952 A1 | 1/2015 | Grant et al. | |
| 2015/0170072 A1 | 6/2015 | Grant et al. | |

FOREIGN PATENT DOCUMENTS

| | | |
|---|---|---|
| CN | 101477554 | 7/2009 |
| EP | 2 343 661 | 7/2011 |
| GB | 2 365 649 | 2/2002 |
| JP | 2002-297619 | 10/2002 |
| JP | 2002-366839 | 12/2002 |
| JP | 2004-177936 | 6/2004 |
| JP | 2004-192166 | 7/2004 |
| JP | 2007-334742 | 12/2007 |
| KR | 10-2000-0037250 | 7/2000 |
| KR | 2000 0053774 | 9/2000 |
| KR | 10-0773206 | 11/2007 |
| KR | 10-0961680 | 6/2010 |
| KR | 10-2012-0000167 | 1/2012 |
| WO | WO 03-052582 | 6/2003 |
| WO | WO 2005/098675 | 10/2005 |
| WO | WO 2008/075883 | 6/2008 |
| WO | WO 2008/120904 | 10/2008 |
| WO | WO 2010/108157 | 9/2010 |
| WO | WO 2013/173636 | 11/2013 |
| WO | WO 2014/150073 | 9/2014 |
| WO | WO 2015/013459 | 1/2015 |

OTHER PUBLICATIONS

Official Communication in European Patent Application No. 10754213.6, dated Feb. 16, 2015.
Office Action in U.S. Appl. No. 13/896,057, dated Apr. 10, 2015.
Official Communication in Chinese Patent Application No. 201080022098.0 dated Jun. 23, 2015.

(56) References Cited

OTHER PUBLICATIONS

Official Communication in Japanese Patent Application No. 2012-501022 dated Mar. 17, 2015.
Official Communication in Australian Patent Application No. 2010226395 dated Oct. 9, 2015.
International Preliminary Report on Patentability in PCT Application No. PCT/US2014/022096, dated Sep. 24, 2015.
Bowman et al., "Harvest: A Scalable, Customizable Discovery and Access System" Technical Report CU-CS-732-94, Department of Computer Science, University of Colorado, Boulder, Mar. 1995.
Buehrer et al., "A Large-scale Study of Automated Web Search Traffic", Airweb'08, Apr. 22, 2008, Beijing, China, pp. 8.
Cheng et al., "Design and Realization of Advertisement Promotion Based on the Content of Webpage" Knowledge Science, Engineering and Management Lecture Notes in Computer Science, 2007, vol. 4798/2007, pp. 502-507.
D-Link Corporation, wishfi MediaSpace, ISP Market Challenges, ISP Solutions, Oct. 20, 2009, 2 pages.
Dou et al., "Are Click-through Data Adequate for Learning Web Search Rankings?", CIKM'08, Oct. 26-30, 2008, Napa Valley, California, pp. 73-82.
Fan et al. "Adaptive Agents for Information Gathering from Multiple, Distributed Information Sources" AAAI Symposium on Intelligent Agents in Cyberspace, Stanford University, Mar. 1999.
Final Office Action in U.S. Appl. No. 13/184,442, dated Jun. 11, 2012.
Final Office Action in U.S. Appl. No. 13/184,448, dated Oct. 21, 2011.
Final Office Action in U.S. Appl. No. 13/184,448, dated Jan. 25, 2012.
Final Office Action in U.S. Appl. No. 13/185,372, dated Jun. 20, 2012.
Freefi Networks, Media Spring PowerPoint presentation, www.freefinet.com, 2009, 22 pages.
Grixti et al., "Targeted Advertisement Through Website User Profiling" web, http://ww.um.edu.mt/_data/assets/pdf_file/0007/67381/Grixti_Lincolon.pdf, Nov. 4, 2010.
International Preliminary Report on Patentability in PCT Application No. PCT/US10/28064, dated Feb. 4, 2014.
International Search Report from PCT Application No. PCT/US10/28064, dated Nov. 4, 2010.
International Search Report in PCT Application No. PCT/US2013/041435, dated Aug. 27, 2013.
International Search Report in PCT Application No. PCT/US2014/022096, dated Sep. 25, 2014.
Kazienko et al., "AdROSA-Adaptive Personalization of Web Advertising" Information Sciences, Jun. 2007, 177(11): 2269-2295.
Koutrika et al., "Combating Spam in Tagging Systems", AIR Web Proceedings of the 3rd International Workshop on Adversarial Information Retrieval on the Web, 2007.
Kritikopoulos et al., "CrawlWave: A Distributed Crawler", Presented at SETN 2004.
Luiro, Vesa—Director "Mobile Rules" MR Booklet Awards, 2008 Hail to the Kings! Mobile Rules! Winners. Runner-Ups. Finalists, www.mobilerules.org, 70 pages.
Notice of Allowance in U.S. Appl. No. 13/184,442, dated Nov. 20, 2012.
Notice of Allowance in U.S. Appl. No. 13/184,448, dated Jun. 11, 2012.
Notice of Allowance in U.S. Appl. No. 13/870,534, dated Jun. 7, 2013.
Office Action in U.S. Appl. No. 12/728,116, dated Jul. 6, 2012.
Office Action in U.S. Appl. No. 13/184,442, dated Jan. 31, 2012.
Office Action in U.S. Appl. No. 13/184,442, dated Mar. 16, 2012.
Office Action in U.S. Appl. No. 13/184,448, dated Sep. 16, 2011.
Office Action in U.S. Appl. No. 13/184,448, dated Dec. 6, 2011.
Office Action in U.S. Appl. No. 13/185,372, dated Apr. 17, 2012.
Office Action in U.S. Appl. No. 13/185,372, dated Jan. 18, 2013.
Official Communication in Chinese Patent Application No. 201080022098.0 dated Jan. 15, 2014.
Official Communication in Japanese Patent Application No. 2012-501022 dated Apr. 1, 2014.
Radlinski, Filip, "Addressing Malicious Noise in Clickthrough Data," Learning to Rank for Information Retrieval Workshop at SIGIR, 2007, pp. 6.
Shkapenyuk et al., "Design and Implementation of a High-Performance Distributed Web Crawler," icde, pp. 0357, 18th International Conference on Data Engineering (ICDE'02), 2002.
Webpage http://www.google.com/analytics/features/analysis-tools.html as accessed and printed Apr. 5, 2012, pp. 5.
Weiss et al., "HyPursuit: A Hierarchical Network Search Engine that Exploits Content-Link Hypertext Clustering", Proceedings of the Seventh ACM Conference on Hypertext, Bethesda, Maryland, 1996, pp. 180-193.
Zhang et al., "Mining Search Engine Query Logs for Query Recommendation," May 22-26, 2006, pp. 1039-1040.
Zhao et al., "Improve Web Search Ranking by Co-Ranking SVM," IEEE Computer Society, Fourth International Conference on Natural Computation, 2008, pp. 81-85.
International Preliminary Report on Patentability in PCT Application No. PCT/US2013/041435, dated Nov. 18, 2014.
Official Communication in Chinese Patent Application No. 201080022098.0 dated Nov. 15, 2014.
Office Action in U.S. Appl. No. 12/728,037, dated Mar. 5, 2012.
Office Action in U.S. Appl. No. 12/728,037, dated Oct. 22, 2012.
Office Action in U.S. Appl. No. 12/728,037, dated Jun. 4, 2013.
Notice of Allowance in U.S. Appl. No. 12/728,037, dated Dec. 10, 2013.
Notice of Allowance in U.S. Appl. No. 12/728,037, dated Mar. 20, 2014.
Notice of Allowance in U.S. Appl. No. 12/728,037, dated Jul. 22, 2014.
International Search Report in PCT Application No. PCT/US2014/047907, dated Nov. 7, 2014.

* cited by examiner

Ad Space on MY Computer for Sale — its my monitor for God's sake

Browser | Ads

Target
- ☑ Google Search
- ☐ Google Ads
- ☐ Bing Search
- ☐ Double Click
- ☑ Yahoo
- ☐ Ask.Com
- ☐ MSN

→ SELECT TYPES OF ADS OR LINKS TO TARGET — 302

Address www.yahoo.com ▼ | Go

☐ Just Do It

URL http://m.www.yahoo.com/

Sponsored Links

[ Find Ads ] [ Replace Ads ] ← MANUAL CONTROLS — 304

My Account

$0.600

Ads of Interest
- ☐ Sports
- ☐ Music
- ☐ Technology
- ☐ Electronics
- ☐ Cloths
- ☐ Adult

→ SELECT TYPES OF ADS OR LINKS TO INTEREST — 306

Other list or Profile options ▼

My Demographic Profile

☐ Male ☐ Female

☐ Single ☐ Married ☐ Divorced

→ SET DEMOGRAPHIC PROFILES — 308

Birth Month: 02 ▼ Birth Year: 1964 ▼

Highest Level of Education:

Graduate School Degree ▼

My Proxy/Peer Configuration

☐ Use Only Trusted Peer Nodes
☐ Use Any Peer Nodes

→ OPTIONAL PROXY SETTINGS — 310

List of Proxy Addresses/URLs:

192.168.1.100
proxy.advantage.com

*FIG. 3A*

Ad Space on MY Computer for Sale – its my monitor for God's sake

Browser | Ads

Target
- ☑ Google Search
- ☐ Google Ads
- ☐ Bing Search
- ☐ Double Click
- ☑ Yahoo
- ☐ Ask.Com
- ☐ MSN

SELECT TYPES OF ADS OR LINKS TO TARGET — 402

Address
www.yahoo.com  ▼  Go
☐ Just Do It

URL
http://m.www.yahoo.com/

Sponsored Links
[Find Ads]  [Replace Ads]

MANUAL CONTROLS — 404

My Account
$0.600

Ads of Interest
- ☐ Sports
- ☐ Music
- ☐ Technology
- ☐ Electronics
- ☐ Cloths
- ☐ Adult

SELECT TYPES OF ADS OR LINKS TO INTEREST — 406

Other list or Profile options ▼

My Demographic Profile
☐ Male  ☐ Female
☐ Single  ☐ Married  ☐ Divorced
Birth Month: 02 ▼  Birth Year: 1964 ▼
Highest Level of Education:
Graduate School Degree ▼

SET DEMOGRAPHIC PROFILES — 408

My Proxy/Peer Configuration
☐ Use Only Trusted Peer Nodes
☐ Use Any Peer Nodes List of Proxy Addresses/URLs:
192.168.1.100
proxy.advantage.com

OPTIONAL PROXY SETTINGS — 410

*FIG. 4A*

METHODS AND SYSTEMS FOR SEARCHING, SELECTING, AND DISPLAYING CONTENT

CROSS-REFERENCE TO RELATED APPLICATIONS

This is a continuation of U.S. patent application Ser. No. 12/728,037, filed Mar. 19, 2010, which claims the benefit under 35 U.S.C. § 119 of U.S. Provisional Application No. 61/161,944, filed Mar. 20, 2009, and U.S. Provisional Application No. 61/292,093, filed Jan. 4, 2010, the contents of which are incorporated herein by reference in their entirety. This application is related to co-pending application, entitled METHODS AND SYSTEMS FOR PROCESSING AND DISPLAYING CONTENT, Ser. No. 14/045,239 filed Oct. 3, 2013, and co-pending application, entitled METHODS AND SYSTEMS FOR PROCESSING AND DISPLAYING VIDEO CONTENT, Ser. No. 13/836,672 filed Mar. 15, 2013, the contents of which are incorporated herein by reference in their entirety.

STATEMENT REGARDING FEDERALLY SPONSORED R & D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

Field of the Invention

The present invention is related to methods and systems for identifying and presenting information, such as information related to a search query or located in an electronic representation of data.

Description of the Related Art

The Internet has become an essential tool for large numbers of people. The Internet is used to perform searches, run applications, review content, communicate with others, house emails and files, etc.

With respect to searching, search engines typically utilize an algorithm to compile search results relevant to a user's search query. Certain search engines raise revenue by charging advertisers to have their listings appear higher up in the search results and/or by displaying advertisements related to the search query on the same page as the unpaid search engine results. However, disadvantageously, often such search engines fail to display items that are of sufficient interest to a given user.

SUMMARY OF THE INVENTION

The present invention is related to methods and systems for identifying and presenting information, such as information related to a search query or with respect to an electronic representation of data (e.g., a Web page, content stream, data provided via a service or application, etc.).

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain embodiments modify, insert, overlay and/or replace content (collectively referred to as enhanced content placement). For example, the enhanced content placement can be performed with respect to search result listings or other content from a web page or data provider.

Certain embodiments substitute original content with replacement content, and/or augment the placement/position of certain content on a search results page, such as by reordering search results or inserting a listing within an original search result listing. Optionally, inserted/replacement content may overlay (e.g., as a pop-up or a layered content) unwanted or less desirable content. Optionally, a user and/or software application may be provided with a control via which the user/application is provided the ability to toggle the inserted content on or off to reveal the original content configuration (e.g., the original order of the content, such as the original ordering of a search result listing, or the original advertisements) before the page modification was made.

An example embodiment provides a system, comprising: a processor; tangible, non-transitory media that stores a program that when executed by the processor is configured to perform operations, comprising: receiving search results from a search engine, the search results including a listing including one or more links; selecting a link to a networked site associated with a first entity based on at least one selection criterion; determining at least one of the following: whether the search result listing includes the link to the networked site associated with the first entity; whether the link to the networked site associated with the first entity is at a list position that fails to satisfy a first criterion; at least partly in response to determining that: the link to the networked site associated with the first entity is not included in the search result listing, or the link to the networked site associated with the first entity is not at a position in the search result listing that satisfies the first criterion, modifying the search listing by causing the link to the networked site associated with the first entity to appear in a first position in the search listing; and causing, at least in part, the modified search listing to be displayed on a user terminal.

An example embodiment provides a system, comprising: a processor; tangible, non-transitory media that stores a program that when executed by the processor is configured to perform operations, comprising: receiving over a network search results from a remote search engine, the search results including a listing including one or more links; selecting a networked site link, wherein the network site link is selected based on at least one selection criterion; and modifying the search listing, wherein the search listing is modified by causing the link to the networked site to be positioned at a selected position in the search listing, wherein the selected position is selected based at least in part on a level of service subscribed to by an entity associated with the network site link.

An example embodiment provides a method of processing search results, comprising: receiving over a network at a computer system search results from a remote search engine, the search results including a listing including one or more links; selecting, using the computer system, a networked site link, wherein the network site link is selected based on at least one selection criterion; and modifying, using the computer system, the search listing, wherein the search listing is modified by causing the link to the networked site to be positioned at a selected position in the search listing, wherein the selected position is selected based at least in part on a level of service subscribed to by an entity associated with the network site link.

Tangible, non-transitory media that stores a program that when executed by the processor is configured to perform operations, comprising: receiving search results from a remote search engine, the search results including a listing including one or more links; selecting a networked site link, wherein the network site link is selected based on at least one selection criterion; and modifying the search listing, wherein the search listing is modified by causing the link to the networked site to be positioned at a selected position in the search listing, wherein the selected position is selected based at least in part on a level of service subscribed to by an entity associated with the network site link.

An example embodiment provides a system, comprising: a processor; tangible, non-transitory media that stores a program that when executed by the processor is configured to perform operations, comprising: transmitting instructions to a plurality of nodes, the nodes including respective computing devices, wherein the instructions are configured to cause at least in part the plurality of nodes to: automatically issue search requests, activate links in search results, and/or issue uniform resource locator requests, so that a first of the plurality of nodes issues a search, activates a link, and/or issues a uniform resource locator request at a time different than a second of the plurality of nodes; issuing a report over a network, the report providing information related to the number of times the plurality of nodes issued search requests, activated links, and/or issued uniform resource requests.

An example embodiment provides a method, comprising: transmitting from a computing system instructions to a plurality of nodes, the nodes including respective computing devices, wherein the instructions are configured to cause at least in part the plurality of nodes to: automatically issue search requests, activate links in search results, and/or issue uniform resource locator requests, so that a first of the plurality of nodes issues a search, activates a link, and/or issues a uniform resource locator request at a time different than a second of the plurality of nodes; generating, using the computer system, a response, and issuing the report over a network, the report providing information related to the number of times the plurality of nodes issued search requests, activated links, and/or issued uniform resource requests.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

FIGS. 3, 3A, 3B and 3C, collectively, illustrate an example user interface.

FIGS. 4, 4A, 4B and 4C, collectively, illustrate another example user interface.

DETAILED DESCRIPTION OF PREFERRED EMBODIMENTS

Figure 1:
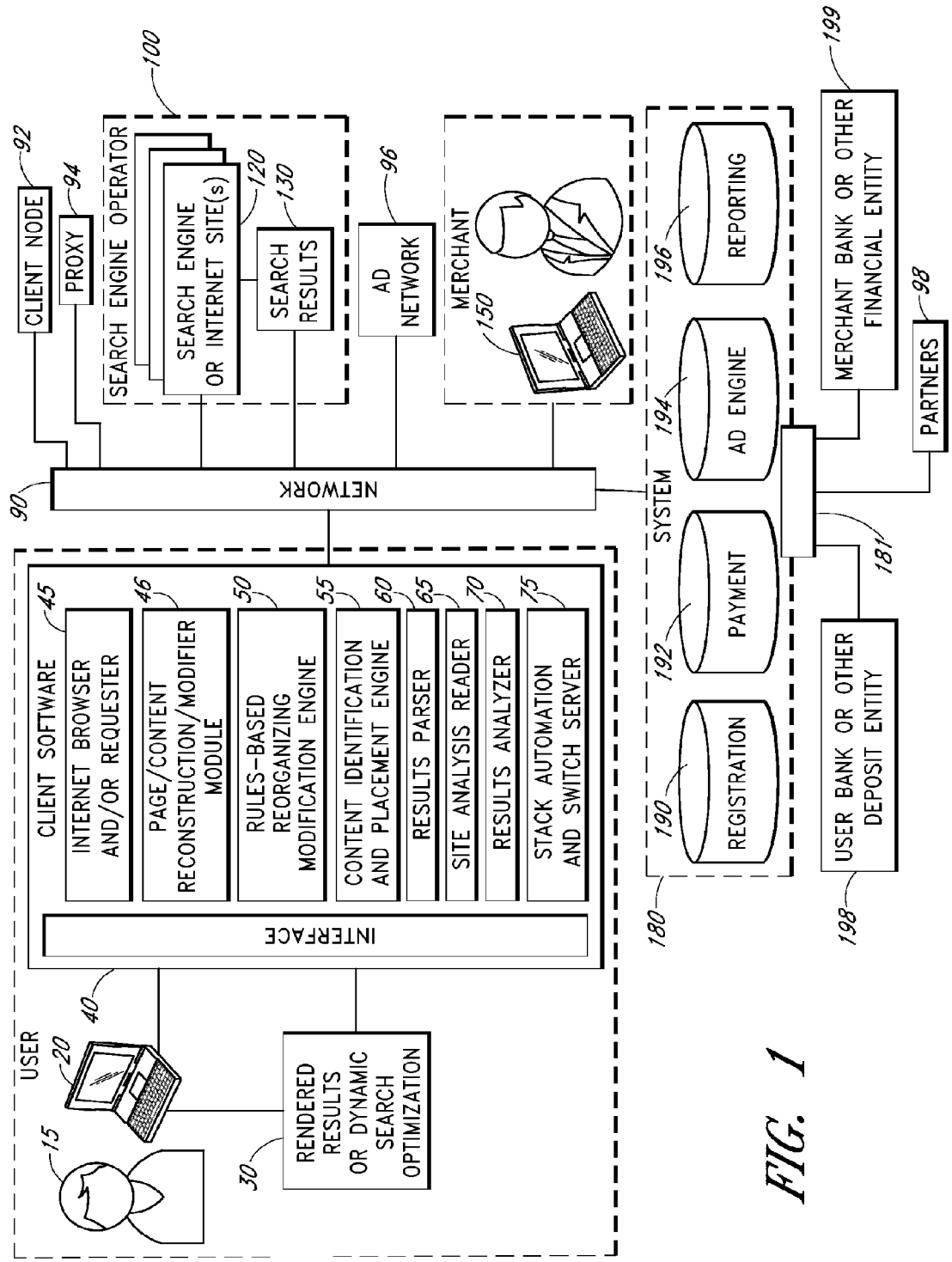
FIG. 1 illustrates an example architecture for an advertisement enhancement/ranking improvement system.

Methods and systems are described for improving the ranking, position, and/or presentation of content (e.g., wherein the content is one or more HTML links, media, advertisements, summary text, or URLs (Uniform Resource Locators) in a list of search results or web site).

As will be described in greater detail below, certain embodiments utilize or operate in the environment of distributed networked system to modify, insert and/or replace content, such as one or more advertisements or one or more listings with respect to a search result listing (collectively referred to as enhanced content placement). For example, the enhanced content placement can be performed with respect to search results, such as search results provided via a web page by a third party search engine in response to a user query, or in a content web page/media stream accessed via a content provider, such as web pages or other media stream from a news web site, an entertainment related web site, a blog, a social networking site, a media sharing site, a web application (e.g., a web based email application or calendar), etc. Optionally, certain embodiments provide such enhanced content placement with the cooperation from the entity that operates the search engine and/or the web page provider to thereby provide content on their behalf to more relevant users and/or to provide more relevant content to their users. Optionally, certain embodiments provide such enhanced content placement without cooperation from the entity that operates the search engine (and optionally without providing a communication to the search engine site that indicates the enhanced content placement is being performed) and/or the web page provider. Certain embodiments described herein provide a distributed contribution and reward system and process for payments or credits.

In particular, certain embodiments optionally address shortcomings of conventional search engines, search engine optimization techniques, content page/document delivery and online advertising industry models. For example, certain embodiments improve the user experience and the results of an advertisement program, optionally based at least in part on user rules and preferences, by substituting a given advertisement with another advertisement, by augmenting the placement of an advertisement or other content on a search results page and/or by reordering search results or other content, optionally without the cooperation from and/or or knowledge of the search engine operator and/or web page provider.

Many conventional search engines display search results and related advertisements, where the displayed advertisements may be selected at least in part on the relevance of the advertisement to a search query and a payment from the advertiser. For example, many conventional search engines display search results and related advertisements, where the search results are ranked based on a variety of factors, such as number of matched words, frequency of matches, word proximities, age or date of the information, Boolean expressions, payment, and other criteria. In addition to ranking items in a search result based on the relevance of the search criteria, companies that operate search engines offer improved ranking or visibility to an advertiser for its advertisements/listings and their partners for a fee. One disadvantage of these conventional fee-based methods is that they make the distributed input of users less relevant and often ignore user relevant weighting criteria or participation. Therefore, such conventional methods often fail to provide advertisements or other content (e.g., as part of search results) that are of sufficient relevance to a given user.

The Internet is so vast that it is overwhelming for Internet users to consider the entire search results from search engines providers. For example, at the time of this example a simple search on the topic of "Eagles" returned 565 million references on Yahoo, 170 million references on Google and 94 million references on MSN. Further, the references listed for each of these companies in this example were not consistent, meaning each of these engines used different criteria for storing, retrieving or displaying their results leaving the user to navigate the proverbial "needle in a haystack" to locate any particular reference or link desired. Statistically this creates an unbalanced model and disadvantages for users because the search results or advertisements that are of more relevance to a user are not presented first or with an appropriate ranking, and so a user has to navigate through large numbers of search results, advertisements, and web pages with little or no relevance to the user to find those of interest.

A site wishing to be more visible or gain relevance can utilize specific and often dynamic techniques to improve their ranking or pay a fee to improve their visibility. Often, a site that wants to improve their listing employs the help of a Search Engine Optimization (SEO) company to help enhance their visibility. These companies conventionally use techniques including customized text, embedding hidden text or metadata within the reference, submitting references to many search engines, creating multiple links to the same text and various other techniques to increase relevancy scores within search engine algorithms.

The challenge faced by SEOs and their customers is that conventionally their methods employed for improving customer visibility are static, very manual, and do not produce lasting or maintainable results. Search portals also attempt to normalize these techniques to increase their revenues by ignoring meta tags or repeated words to counter SEO tactics so that the advertiser, merchant or content provider has to pay equal or higher costs to achieve a certain ranking or to be recognized. Further, conventional SEO solutions do little to increase the frequency scoring attributes for search engines in the public forum and are therefore disadvantaged. Similarly, a company that desires to make their advertisements more visible may be required to pay extra fees and contract exclusively with delivery networks to display their advertisements, which may or may not be displayed relative to the user's interests.

A challenge faced by many advertisers is that the desired content or the interests of a user to whom advertisements are to be displayed are not fully expressed though search queries or by general browsing, and conventionally there is no direct feedback from the user except for when an advertisement link is selected. While certain advertisers may attempt to use cookies, browsing behaviors, IP Address reverse location, and inferred demographic information by way of sustained login to a particular site to gather user information for advertisement targeting purposes, such methods are relatively ineffective and are often blocked by protection software. Thus, conventionally, advertisers are not adequately delivered the desired types of viewers for their advertisement, and the advertisers conventionally do not know which viewers viewed their advertisements (unless the viewer clicked on the advertisement, assuming it is linked, and completed a subsequent transaction with the advertiser or its partner).

An enhanced search engine architecture, content distribution architecture and related technology described herein overcome some or all of the foregoing disadvantages and provide a novel paradigm for Internet search portals, content providers, and/or advertisement networks. For example, certain embodiments may be used to supplement existing search technologies by substituting more relevant or participatory content in the search results presented to a user. By way of example, content may include one or more of advertisements, images, news feeds, text, links, streaming media, personal photographs, blogs, twitter messages, or other content.

Described below are example embodiments. The embodiments may be implemented via hardware, software, or a combination of hardware and software. For example, certain embodiments may include software/program instructions stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, WiFi, Bluetooth, T1, DSL, cable, optical, or other interface(s) which may be coupled to the Internet), content databases, customer account databases, etc.). By way of example, a given computing device may optionally include user interface devices, such as some or all of the following: one or more displays, keyboards, touch screens, speakers, microphones, mice, track balls, touch pads, etc. While certain embodiments may be illustrated or discussed as having certain example components, additional, fewer, or different components may be used. Further, with respect to the processes discussed herein, various states may be performed in a different order, not all states are required to be reached, and fewer, additional, or different states may be utilized.

While certain embodiments discussed herein utilize a client software application hosted on a user terminal and configured to perform certain functions, some or all of the functions are optionally performed instead or in addition by a device (e.g., a computing device) remote from the user terminal that is directly or indirectly in communication with the user terminal, such as a peer note, or proxy node, network appliance or another device, that may run software that provides some or all of the client software functionality described herein.

As discussed above, an example embodiment may be utilized with client software executing on a client device (e.g., a terminal, such as a personal computer, a wireless cellular device, an interactive television, other entertainment device, a personal digital assistant, router, switch, other terminal, etc.), sometimes also referred to herein as a "node". The client device may be coupled to one or more components of a distributed search engine and content distribution system, which may include a central system (wherein the term "central" is intended to be functional in nature, not geographical in nature), one or more proxies, and/or other nodes.

By way of example, the client software may be downloaded over a network from one or more system components, such as the system 180 illustrated in FIG. 1, or may execute on a remote proxy system, peer note and/or other connected system. For example, a component may be configured to store and transmit the client software to the user device, or the client software may be provided by direct, tangible media, such as removable magnetic, optical, or solid state media. The software is installed on the user's client system, or a proxy node accessed by the user. In addition, one or more peer node(s) and/or other systems can be referenced by the user node as the user's proxy. Optionally, nodes can pull content (e.g., to be used in replacing or modifying original content) ahead of time to work independently against a locally stored cache.

Optionally, nodes (e.g., user peer nodes 92 and/or enterprise proxy nodes 94) can serve up content, in part or in whole, to other nodes so that a modified page or media stream may have come from a plurality of nodes and the discrete ads or content may have been further subdivided so that any given node only provides a certain percentage (e.g., 5%, 10%, 50%, or other percentage) of the actual content, thereby reducing the load on a given node. Thus for example, in either a pull or push operation, a given user node may receive portions of an advertisement from 2, 5, 10, or more other nodes, and the given user node then assembles the various portions into a complete advertisement for display to the user.

By way of example, a peer node or nodes, which may include one or more client software nodes, may be configured to share some or the entire processing and distribution load for another user node. By way of illustration, the client software installed on a device may optionally pull content from one or more peer node(s) that have already aggregated the same or similar content, rather than from a central system. A proxy node may include client software executed by a computing device (which may be the same as or different software than that installed on the user device), that performs some or all the tasks that one or more client nodes have delegated to the proxy node. The proxy node optionally may only return the updated page and content to the requesting client software nodes, rather than providing versions of a page/content that have already been received by the requesting client node. This approach reduces the overall bandwidth utilization and processor utilization by the requesting client node and by the proxy node as duplicative data need not be transferred over the network between the client and the proxy node. Additionally, this approach allows the user to forgo installing some or all of the client software on their client node and to directly or indirectly access the proxy node to receive some or all of the functionality provided by the software.

Optionally, content may be downloaded to a user terminal in batch mode, before it is even determined that it will be displayed to the user, based in part on the user's profile. This enables the client software to access and parse content already received on the host user terminal, such as by pulling the content from the user terminal's local cache (or optionally, from a peer node, a proxy node, or other remote system). Accessing the content locally enables the parsing and process to be performed much faster than if the content had to be accessed remotely when needed, thereby improving for the user's experience and enabling large volumes to be managed effectively. Further, caching the content ahead of time enhances the operation of the merchant/partner interfaces. By way of illustrative example, if a user's interest is baseball (e.g., as specified in the user's profile), the user's node may pull down "static ads" related to baseball, which may include expiration dates with these ads, for 90% of the replacement pool, while 10% of the ads may be in the form of dynamic content, such as a live news feed or fresh content, which would be accessed in real time, when needed. Thus, when the user node fetches a page, the ad engine (or peer or proxy) may pull from the local cache the same "static" ad that would have been served had the user node pulled the static ad from the remote server in real time. If the expiration date(s) for some or all of the cached ads is reached, the user's node may pull down additional ads with expiration dates that have not yet been reached.

In an example embodiment, once the client software is installed (e.g., on the user device and/or a proxy node), the user can optionally configure the client software to run automatically in the background (sometimes referred to herein as a "passive mode"), to automatically submit search queries/URL requests (e.g., based on an instruction from a remote system), optionally without providing the results for display to the user. Optionally, the user can also configure the client software to run interactively based at least in part on the user's actions (sometimes referred to herein as an "active mode"). For example, the client software may parse, modify, and/or replace content received as a result of a user-submitted search query (e.g., search results from a search engine) and/or may parse, modify, and/or replace content received as a result of a URL specified by the user or received as a result of a link activation by the user.

Users can optionally configure execution preferences that affect the behavior of the client software (or remote software performing some of all of the functions described herein with respect to the client software) via a user interface (e.g., a form provided via the client software or via a web page accessed using a browser or other interface, wherein the user can check off or otherwise select performance parameters) provided for display by the client software, browser, or otherwise, and the preferences are stored in memory (e.g., local memory or remote memory). For example, a user may configure the software to operate:

only when the user's systems is idle (e.g., when system resources are not being used by other applications, or when one or more specified system resources are being used at less than a specified threshold amount (e.g., 1%, 5%, 10%, 20%, etc.). For example, when the usage of one or more system resources, such as the central processing unit and/or disk drive, is less than a specified percentage of total resources);

at particular scheduled times;

on specific sites;

for specific content; and/or for specific advertisement/content providers.

Optionally, a user interface is similarly provided (e.g., an electronic form) via which a user can enter in relevant demographic data about the user, the user's household, the user's place of employment, and/or other users of the user terminal. For example, the demographic data can include some or all of the following:

age;

gender;

marital status;

level of education;

geographic location (which may include the user home and/or work address);

income;

work category/profession etc.

The demographic data is optionally provided by the system and used by advertisers and content providers (e.g., advertisers, ad servers, ad networks, DSPs, and/or the system operator) to select and provide for display content, search results, and/or advertisements relevant to the user. Such demographic data may be provided in varying increments as incentives or rewards for participation or improved experience. For example, a user interface may be provided via which the user can enter demographic information. If the user provides a first type of information, such as age, the user may be provided with a first level of discount (e.g., 1 point or a 5% rebate/discount). If the user includes their gender the user may be provided with a second level of discount (e.g., 5 points or 15% rebate/discount). The user may be provided with a third level of discount if the user provides both the user's age and gender (e.g., 10 points or 25% rebate/discount). Other levels of discounts may be provided for such user-provided information and combinations thereof, such as income level/range and categories/topics of interest, to help advertisers better target ads that are relevant to the users age, income, gender, and field of interests.

Incentives and rewards may include one or more of the following: money deposited in a user account, shared revenues (e.g., where the user is provided a portion, such as a percentage or a fixed amount, of fees paid by advertisers), recognition (e.g., a thank you note or a banner acknowledgement), discounts on purchases of items or services (e.g., for items or services being advertised by the insert/overlay/replacement/modified advertisements), ISP access discounts, free access at HotSpots, redeemable coupons or certificates for services or products, credits, tokens, or other monetary or non-monetary reward.

The user's demographic data and interest data (that specifies topics or areas of interest to the user) may be stored (e.g., locally and/or remotely in memory) as one or more quick reference profiles that allow the user to rapidly specify and/or to rapidly modify the demographic data and/or the interest data used by the system to select or create relevant content or ads and/or to insert a listing in a search result. For example, the user can access one or more electronic forms previously completed by the user and enter additional information and/or modify existing information, and the new and/or modified information is then stored for later access.

Optionally, a user may be able to define and store multiple profiles. For example, a user may define a work profile that specifies areas of interest to be used in selecting advertisements/content for when the user is at work. The same user may define a home profile that specifies areas of interest to be used in selecting advertisements/content for when the user is at home. Optionally, the user may manually select the profile to be used at a given session via a control provided on a web page, via the client software, by logging into to the desired profile, or otherwise. Optionally, the profile is automatically selected by the system/client software based on information that indicates where the user is physically located (e.g., via an identifier associated with the terminal the user is currently using, via a MAC address, or otherwise).

Optionally, in addition to or instead of the other parameters described herein, systems and methods described herein may take into account the physical size and/or dimensions of content (e.g., an advertisement) being overlain or replaced, wherein the replacement content is identified and selected so as to fit within the dimensions of the content being replaced (or which can be scaled to fit within the dimensions of the content/advertisement being replaced while still being readable/adequately viewable).

Unless the context indicates otherwise, the term "replace" as used herein includes removing an existing document/item of content, such as an image, photograph, video, or text document, as well as to removing a reference (e.g., a URL link) to such a document/item of content, and then replacing the existing content with different content or a reference thereto. Thus, the phrase "replace original content with replacement content" is intended to cover both the case where an actual item of received original content (e.g., received as part of a web page) is being replaced with an actual item of replacement content, and the case where a link (e.g., in an HTML text stream for a web page) to an item of original content is replaced with a link to the replacement content. The phrase "replace original content with replacement content" is further intended to encompass the case where the original content is "present" but made invisible (e.g., with a "hidden" attribute) and the replacement content is located at substantially the same location as the original content, but is not hidden.

Optionally, the user may configure the client application to only access a specific category of sites or to only display content related to a user specified interest, or to remove advertisements completely from search results and/or other web pages, or to have personal or desired content follow them from page to page (e.g. a picture of their spouse that may be displayed overlaying/replacing unwanted advertisements on any web page including but not limited to their email page, their favorite news, entertainment or weather pages/sites and/or other page/site that is displayed).

The client software application optionally further provides a user interface via which the user can specify that the client software application is to only communicate with selected peer nodes, a proxy system, and/or a central system, or may communicate with any peer nodes (e.g., not just trusted nodes). The client software application hosted on the user terminal, peer node and/or proxy node may optionally be configured to gather information and content from other peer nodes, and communicate content and information to other peer nodes, without having to communicate directly with a central system that may act as a central repository of content/advertisements and/or transactions, thus offloading the central system and enabling the client software application to operate even if the central system is overloaded, has failed, or is otherwise unavailable. Additionally, content or advertisement may be subdivided among one or more system nodes such that a portion of any given webpage, advertisement or other content may be retrieved of a plurality of nodes substantially simultaneously, in series or a combination thereof.

For example, the client software may request content from another peer node (optionally based on its proximity to the node hosting the client software, which the request is provided to a peer node that is relatively closer to the requesting node than other nodes) that has already been distributed relevant content, thereby possibly providing faster and safer access to the content than having to access the content from a central repository system. By way of further example, the client software may request content and a web page from a proxy node which may also host the client software. In these two examples, the proxy node or the peer node may receive the web page request and create aggregated content (e.g., the subsequent web page with relevant content, ads and links), and transmit this aggregated content to the requesting client software, or store information or data without generating the aggregated content, thereby enabling the client software to more rapidly and securely access the stored information and data, and create the desired web page content.

FIGS. 3 and 3A-C and FIGS. 4 and 4A-C include example user interfaces that illustrate the identification of content and advertisements (by the client application and/or other distributed search engine and content distribution system components), to thereby enhance or modify the content/advertisements based at least in part on the user's preferences, interests, demographic profiles and/or other information provided by the user via the client software or otherwise. For example, the software might be an add-on to the user's preferred browser or running on a proxy node that the users connect through to access internet content. For example, the user interfaces may be presented via a web page, a page panel, a model dialog form, and/or via a wizard that enables the user to specify information that may be used to help identify and present desirable content to the user, and to specify when and where the user may want such information, based in whole or in part on their configured preferences in a user friendly way.

FIGS. 3 and 3A-C illustrate the identification of image advertisements from specific providers. By way of example, such identification may optionally be performed by recognizing known URLs (e.g., known to be associated with advertising content) or unknown URLs, SGML/HTML tags (e.g., associated with advertising content), template masks, page handler algorithms, parsing the Document Object Model (DOM) structure, by manually tagging and identifying advertising content, by performing a string search (e.g., to identify advertising text, such as words or phrases associated with general or specific advertising, or to identify specific URL codes), by performing a content index search, and/or using other techniques.

Referring to FIGS. 3 and 3A-C, a user interface is provided including the following interfaces via which a user can customize the identification and/or replacement of advertisements and/or the ranking of search results (although fewer or additional interfaces may be used):

Optional Interface 302, via which the user can select the types/sources of advertisements and/or links to target for overlay, replacement or modification;

Optional Interface 304 via which a user can manually specify whether advertisements on the current displayed page are to be located and identified to the user and/or whether the identified advertisements are to be hidden, overlaid or replaced;

Optional Interface 306 via which a user can specify advertisements and/or links that are of interest to the user (e.g., that the user would want to be used to replaced other advertisements of less interest), for example the user can specify topics of interest such as sports, music, technology, etc;

Optional Interface 308 via which the user can specify the user's demographic profile (e.g., gender, marital status, birth year, birth month, highest level of education, etc.);

Optional Interface 310 via which the user can specify proxy settings (e.g., use trusted peer nodes only, use any peer node, etc.).

In this example, an image advertisement 312 (e.g., a photograph, a graphic, streaming media, etc.) that is to be overlaid, modified or replaced is identified and optionally highlighted (in this example and illustration, by a border placed by the client application around the image advertisement, although other forms of highlighting may be used). In this example, the original advertisement to be replaced was not selected as a result of a search query. Optionally, the image advertisement is not highlighted to the user and the replacement/modification is optionally performed automatically and transparently to the user so that the user is not aware that a given advertisement is being replaced or modified and the given advertisement is optionally not displayed to the user via the web page prior to being automatically replaced.

FIGS. 4 and 4A-C illustrate the identification of textual links and sponsored text advertisements for specific providers. Referring to FIGS. 4 and 4A-C, a user interface is provided including the following interfaces via which a user can customize the identification, modification, overlaid and/or replacement of advertisements:

Optional Interface 402, via which the user can select the types/source of advertisements and/or links to target for replacement or modification;

Optional Interface 404 via which a user can manually specify whether advertisements on the current displayed page are to be located and identified to the user and/or whether the identified advertisements are to be modified, overlaid or replaced. Optionally, the advertisement is not highlighted to the user and the replacement/modification is optionally performed transparently to the user so that the user is not aware that a given advertisement is being replaced or modified.

Optional Interface 406 via which a user can specify types of content, advertisements and/or links that are of interest to the user (e.g., that the user would want to be used to make such information of interest more visible to the user and/or be used to replace other advertisements of less interest), for example the user can specify topics of interest such as sports, music, technology, etc;

Optional Interface 408 via which the user can specify the user's demographic profile (e.g., gender, marital status, birth year, birth month, highest level of education, etc.);

Optional Interface 410 via which the user can specify proxy settings (e.g., use trusted peer nodes, use trusted proxy node, use any peer node or proxy node etc.) directly or indirectly connected to client software/client device.

In this example, several original textual advertisements 412 that have been selected by the search engine based at least in part on the user's search query, are identified to be modified or replaced and are highlighted (in this example, by a border placed by the client application around the textual advertisements to be overlaid, hidden, modified or otherwise replaced). In particular, in this example, a textual advertisement 414 in a targeted advertisement area on the side of the main search result listing, and a textual advertisement 416 in a targeted advertisement area above the main search result listing are selected for replacement.

As discussed above, the software providing functionality described herein may be installed on a local user device (e.g., a personal computer or other terminal). Optionally, in addition or instead, an enterprise proxy system may used (e.g., operated by an employer, a store, a government entity, on a vehicle (e.g., a train or plane) operator, a hotspot, etc.), wherein the user browser is re-pointing to the proxy system, such as using acceptance scripting ("do you accept . . . ") or a software utility installed on the user device to support the proxy. This provides for a relatively broader reach, as the user can benefit from the functionality using terminals that have not been specifically configured, and the services can be reached via WiFi/hotspots (e.g., at hotels, chain stores, airplanes, etc.). Optionally, a user interface is provided (e.g., via a web site) via which a user can configure user preferences and specify user demographics.

Optionally, the functionality discussed herein can be provided in whole or in part utilizing a network/ISP model, optionally without the user having to install additional software on the user's device. For example, the proxy service may be performed by a user's ISP or network provider. Optionally, a user interface is provided (e.g., via a web site) via which a user can configure user preferences and specify user demographics.

Two or more implementations (e.g., client based, enterprise based, and ISP/networked based) can work together as a hybrid, with various combinations of rights, priorities, and overrides. For example, the ISP or enterprise may specify preferred ad networks, but the user client software (based on user configuration information/controls) may still be permitted to select from those preferred ad networks what advertisements (if any) are to be displayed. Optionally, the user client software may be configured to override the enterprise instructions, which may in turn be configured to override the ISP instructions. Therefore, by way of example, the following possible combinations may be used (other combinations may be used as well):

Client device/client software only;
Client device/client software+ISP; override for user;
Client device/client software+Enterprise+ISP; override for user first, enterprise second and then ISP has last priority;
Enterprise only; no override for user or ISP;
Enterprise+ISP; override for enterprise;
ISP Only; no override for user or enterprise.

Figure 5:
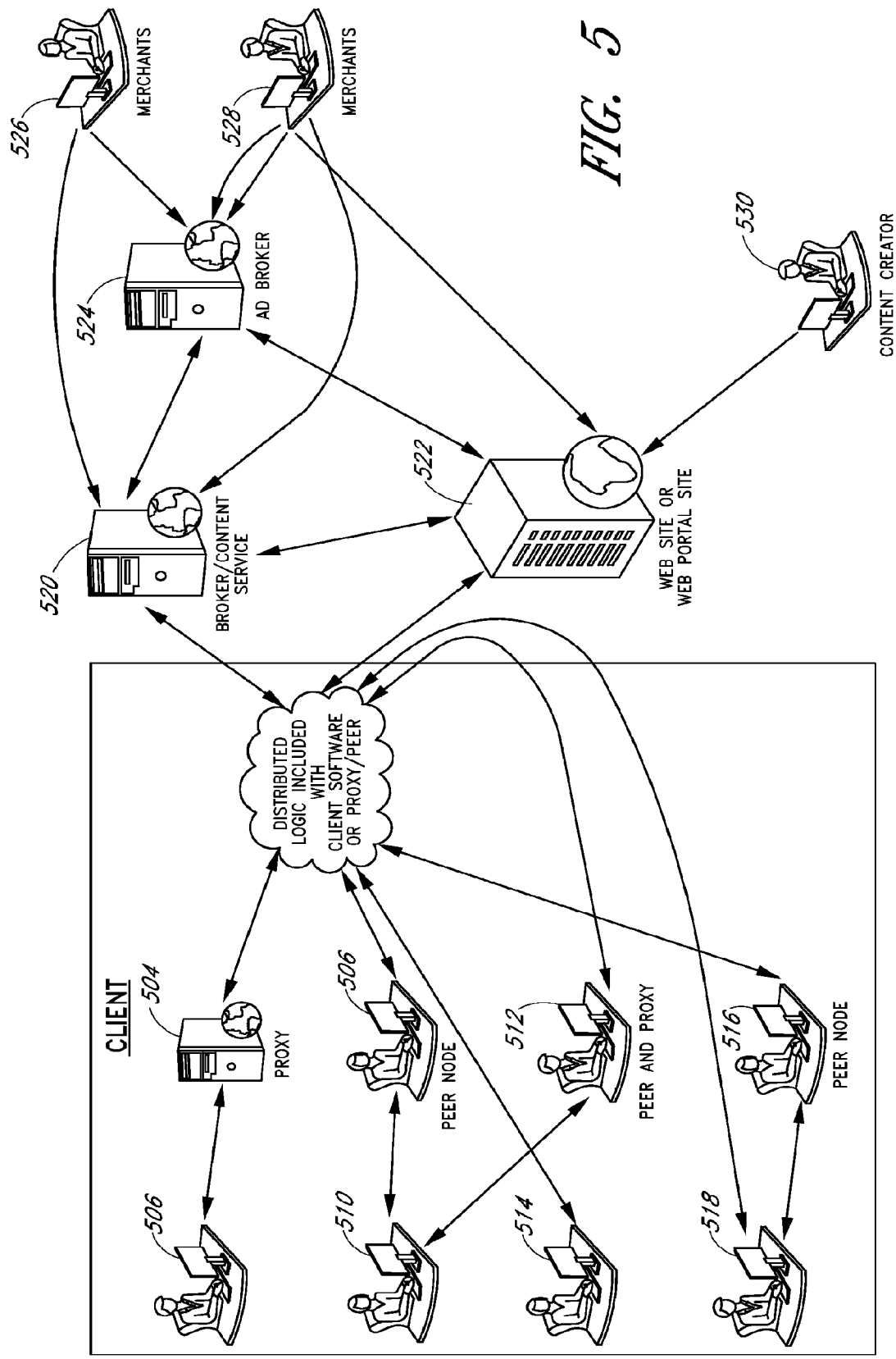
FIG. 5 illustrates an example interaction process with respect to a client software application and components of a distributed search engine and content distribution system.

FIG. 5 illustrates an example interaction process involving the client application in the context of the novel distributed search engine and content distribution architecture. In another embodiment, a broker service is optionally contained completely within the client software, which can access content, advertisement and/or other information and services from existing or traditional ad brokers, ad service providers, ad servers, ad networks, ad network providers, advertisers, ad exchanges or Demand Site Platforms (DSP), from a web portal, and/or a content provider providing the web page for display.

The enhanced search engine and content distribution architecture enables users to influence and participate in the selection and delivery of content and advertisements, optionally utilizing client software installed and executing on a user terminal, peer nodes, proxy nodes, and/or a centralized system (e.g., central system 180 illustrated in FIG. 1). The architecture may leverage existing or conventional ad broker, ad server, ad network, DSP and/or ad provider services with enhanced methods using one or more parameters, including those described above, such as user interests, user demographics, ad size, ad source, ad content, other characteristics, etc.

As similarly discussed above, a user may install client software, such as on user terminals 506, 510, 514, 518. The user may enter the various parameters discussed herein. The client software may or may not require registration based on user configuration parameters. In certain embodiments, the client software and parameters input by the user are registered in a registration system which may optionally include a central system 520, peer nodes 508, 516, the client software system and/or the distributed network architecture 502, which may be the client software installed on one or more nodes/proxies/ISP systems. For example, a distributed software system may receive and transmit data across a network, such as the Internet, and may coordinate input and output with a central control system and one or more distributed nodes or client software. The client software, via the user terminal or proxy node, communicates with the centralized control system and/or may communicate with peer nodes 508, 516 or proxy nodes. Some or all the site requests (e.g., made by the client software) are optionally parsed for information and analysis.

For example, when a user (e.g., via a browser or otherwise) requests a site by URL, the page structure may be analyzed to unmask template structure, URL randomization and other techniques that may be employed to make it difficult to identify ads. By way of illustration, an advertiser (or entity working on behalf of the advertiser) may randomize the name of the link or tag name in order to make it more difficult to identify an associated advertisement. An example embodiment overcomes such challenges by examining the source element value, which is much more difficult to randomize because the source element value is generally referenced by domain (e.g., adservice.acmeadserver.com?Your_Randomized_Add_Link). In this example, the domain is relatively harder to mask than tags. In the user post back, which is a response to a request (e.g. the user clicks on an advertisement link), an example embodiment optionally parses the request, records the parsed request, and builds a counter-solution.

The client software is optionally configured to render, reformat or substitute content (e.g., advertisements) on a user terminal, such as user terminals 506, 510, 514, 518. For example, the replacement content (e.g., more desired or relevant content for the user) may be accessed from a replacement content system 520, which may be in the form of a remote server, proxy node, or network appliance such as a router, and the replacement content can be inserted into web pages served by web server 522. The other content for the web pages served by the web server 522 may be provided by a content creator. The content from the replacement content system 520 may be used to overlay (e.g., as a pop-up, or as layered content), modify, insert or replace content (such as advertisements, links, search results, etc.) served by a conventional ad broker system, ad network, ad exchange, DSP or other ad provider 524 to the web server 522.

For example, with respect to utilizing layered content, the layered content may be selected and/or sized to have substantially the same dimensions as the original content being overlaid. The original content may still be present in the page, but is not visible because it is overlaid with the replacement content. For example, with respect to HTML, the z-order attribute of the replacement content may be set to a higher order than the original content so that the replacement content with be layered above the original content and will obscure the original content. By way of further example, an "invisible" attribute for the replacement content may be set to "false" and an "invisible" attribute for the original content may be set to "true," so that when the replacement content is placed at the position of the original content, the replacement content will be visible, and the original content will not be visible.

Optionally, if there is audio associated with the original content, the audio may be automatically muted when the replacement content is displayed. Similarly, in addition to muting an audio component of original content, other active/streaming media (e.g., video, animation, scripted, etc.) of the original content may be managed. For example, such streaming media or active media may be automatically or programmatically stopped, paused, muted, rewound, cancelled, or otherwise prevented from playing when the original content is replaced/overlaid to reduce the network bandwidth and/or processor utilization that would otherwise be used to reproduce such media of the "hidden" original media. The replacement content may be provided on behalf of one or more merchants, advertiser or publishers 526, 528.

The user may configure the client software to receive (via a pull operation or a push operation) input from the central system, the content system 520, or one or more peer nodes 508, 512, 516, and post output to the central control system or one or more peer nodes 508, 512, 516, which participate in a search optimization and/or content replacement/modification process. Content may also come from content providers, such as ad exchanges, ad servers, ad networks, DSPs, media sharing sites (e.g., photo/video sharing sites, blogs, social networking sites), web-based applications such email or calendar services, etc.

By way of example, user terminal 506 optionally does not have the client software installed, and instead relies on the proxy 504, which does have such software installed, to provide the functionality of the client software for the user terminal 20. By way of example, user terminal 510 optionally does not have the client software installed, and instead relies on the peer node 506 and the peer and proxy 512, which do have such software installed, to provide the functionality of the client software for the user terminal 20. By way of yet further example, user terminal 514 optionally does have the client software installed which can provide the functionality described herein. By way of still further example, user terminal 518 optionally does have the client software installed which can provide the functionality described herein and further can utilize the services of a peer node 516 and/or a proxy node.

Network nodes may serve as information beacons that communicate topology, frequency of display, page configurations, delivery methods, host configuration data (e.g., IP (Internet Protocol) address, OS (operating system) type/version, MAC (Media Access Control) address, etc.) and/or other configuration data between nodes and one or more system components. Network nodes may also request content (actively or passively) from web portals, ad providers and other web sites based on randomized methods or rules, and post back to web portals, web sites and ad networks information randomly or by instruction.

The user may be provided, via the system and methods described herein, a share in proceeds, revenues, shared savings, monitory, other incentives and/or rewards (e.g., cash, coupon, monetary certificate, recognition, credit) for participating in the search optimization and/or content replacement/modification process. Examples of such rewards/incentives many include money, free software, free or discounted access to one or more services (e.g., network access via a hotspot or otherwise, certain content, etc.), advertising-free music/videos, discount coupons, reward vouchers, and/or other items or services. These proceeds, rewards and incentives may be based in part on the level of participation and data configured in the client software (e.g., demographic data, utilization data, status or state data, such as CPU participation and availability, etc.).

By way of example, a user may be provided a first or basic reward or incentive for installing the client software in passive mode (e.g., a first percentage of a service fee charged to an advertiser for increasing an ad's visibility). The user may be provided with a second, larger incentive/reward for employing the client software in "active mode," where the user interacts with content delivered by the client software or peer nodes, such as a percentage of the fees paid by an advertiser for the user clicking on an advertisement, or a discount on a service or product. If the user provides demographic data such as age, gender, or interests (e.g., via the client software, a web page, or otherwise), the reward is optionally increased proportionally or incrementally with a corresponding increase in the amount of information and/or based on the type of information provided by the user.

Active and passive "participation," with or without user intervention, may include some or all of the following:

random searching;

indexing (e.g., Cataloging, sequencing, structure, source and layout of SGML/HTML content);

scoring of results to monitor and report specific reference location (e.g., search a given site and determine that a given line is in X position of Y elements, report the foregoing back to a content selection system, wherein the reference location may be used to increase in identifying contents relevancy over time as measured from a system node);

positioning data and configuration data within resulting sets (e.g., position (e.g., X, Y data, where Y is a list and X is the position in the list)/ranking information regarding a search list or with respect to a number of advertisement served);

simulated execution of the targeted reference to measure and improve results and to identify peer relationship and delivery network configurations (e.g., identify target advertisement, target link, or target link in X position of Y list, and simulate a user's selection of the target advertisement/link by transmitting a request back to the web or content service or server with the target information, such as by sending the click-event back to a web portal with the desired link simulating the user's click on this actual link).

The "participation" behavior may be controlled by software configuration. Active or passive interaction may cause the reprioritization and formatting of results consistent with the user configuration and/or based on rules articulated by the central control systems or peer nodes or proxy and other system nodes.

In non-interactive mode, the software may perform its tasks automatically (e.g., as a background process that does not require a user interface or display activity, status, or other information) and without user interaction, however, even in non-interactive mode, the software may still monitor user's activities and patterns, and adapt the software actions in a non-interactive mode. For example, the client software may operate in the background in non-interactive mode (e.g., while the client system or proxy node is not being used, is relatively idle, or is performing other tasks, such as interacting with web pages using other software), and the client software may still perform the functions of replacing, amending, navigation or communicating information with other systems and networks including the central system 180 illustrated in FIG. 1, with or without displaying the replacement content/modified content.

As previously discussed, in non-interactive/passive mode the software may automatically activate links and/or submit search queries to a search engine, optionally using links and/or search queries provided to the software in a file or otherwise. Optionally, the file may include timing instructions as to when and/or how often links are to be activated and/or searches are to be submitted. Optionally, the software may be instructed to activate links and/or submit search queries on a substantially random basis, optionally within a specified period of time (e.g., within 9:00 AM to 11:00 PM), assuming the host terminal is on.

In interactive mode and in response to an Internet search for a particular item or general content browsing, the client software optionally parses an incoming web page (e.g., provided by a search engine and include search results in response to a user query or any page as a result of browsing) and inserts, substitutes or modifies content to provide the user with content that is more relevant based on the user's configuration characteristics and/or participatory rules defined by the system. This insertion/substitution/modification may include overlaying, reordering, summarizing, and/or replacing search results provided by the search engine to which the user submitted the search query, reordering advertisements, or replacing advertisements, or inserting new content (optionally providing the user with a control via which the user can cause the display of the inserted content to be toggled on or off). For example, an entry in a search result listing provided by a search engine may be moved up or down in the listing based on the user's configuration characteristics and/or participatory rules defined by the system.

By way of illustration, the selection of replacement and/or additive content may include identifying content of similar size, origin, category, type, shape and other various attributes as the original page content in order to preserve page formatting and to conform to the user's expected experience. The selection of replacement and/or additive content may also include identifying and communicating page characteristics, methods and configuration data between peer nodes or a central system. Page characteristics and methods might include HTML Meta data, scripting, referring or embedded URLs, HTML IFrame or DIV tag content encapsulations, script activation methods, dynamically loaded content, and other HTML source code elements and methods used to identify, deliver and activate the requested content. This is optionally done "privately" within the user's device using the software hosted on the device or may be performed on behalf of the user on peer or proxy nodes.

For example, if the user added or modified their existing browser software to include the client software (e.g., as a browser plug-in, software add-on or extension to the network input/output driver stack) the client software enhances the existing browser software to include some or all of the functions of the client software discussed herein, such that web pages or other interfaces displayed, requested or otherwise accessed by the existing Internet browser may be modified, amended, substituted, identified or replaced by the client software.

Because each client software node in the system may appear to act randomly and seemingly independently, the resulting patterns related to content modification or substitution are likely to be ignored and may be difficult for search engine sites and other web page providers to detect, thereby ensuring user privacy with respect to the user's participation in the processes described herein.

FIG. 1 illustrates example components and process states that are optionally included to achieve one or more of the results described herein. Fewer, additional or different components may used.

In particular, FIG. 1 illustrates an example distributed architecture system and the relationships between various example software components. Users, advertisers, and merchants may independently register with this system and may download software modules, such as the client software 40, which form part of the distributed system. The client software 40 receives instructions and information from the central system 180 or peer node(s) or proxy node(s) to make active and passive requests to the search site portals or website providers and may either transform or record the results. Further, FIG. 1 illustrates the client software modules 50-75 that may be used to act on this content to improve reference scoring.

FIG. 1 further illustrates how a merchant may interact with the system to improve the ranking of their entries and/or advertisements in search results on a given search site or improve the visibility or ranking of an existing advertisement or new advertisement independently of service (e.g., where the merchant may provide advertisement/text content but does not actively control when or where such content is displayed and relies on the system to cause the display of the content in a manner that meets the merchant's criteria). Additionally, FIG. 1 illustrates how system components may interact with a financial institution to distribute rewards or compensation.

The Internet browser and requestor module 45 is representative of example requester module, such as Internet browser software, which may or may not be an integrated element of the client software (which may be downloaded separately and from a different source than other modules of the client software 40). In this example, the Internet browser and requester module 45 renders Internet web pages, although other embodiments may render different forms of documents/network resources. Once the user navigates to a given search engine site or other web page or content service provider, a rule-based reorganizing and modification engine 50 enumerates and identifies the various web page elements (e.g., using a HTML Document Object Model parser, a string search, a page handler algorithm, etc.) such as some or all of the following: text, images, advertisement, etc., to identify possible target web page elements to modify/reorganize/replace.

An interface module 76 enables the client software to interface with other application software such as internet browsers, cell phone applications, instant messaging programs, chat software and other tools, applications and utilities.

An content placement engine 55 evaluates the cataloged elements and may communicate with other system components, or other service providers or peer nodes, to assemble part or all advertisements or content that may (or optionally may not be) more relevant to the user's profile(s) and/or the user's software configuration parameters. A results parser module 60 catalogs and may disassemble the results page into discrete web page elements which than may be reviewed by a site analysis reader module 65 to determine if the site and the site content is known and/or expected.

A results analyzer 70 optionally then makes a determination as to what web page elements were included or will be returned. Based, in whole or in part, on the client software configuration and system rules, a stack automation (e.g., network device layer, operating system kernel, input/output stack layer, etc.) and switch server 75 and/or page/content reconstruction/modifier module 46 may then reassemble the rendered web page using some or all of the original elements and optionally using new elements that are substituted or inserted dynamically in the resulting web page. These elements may exist locally, may be delivered in whole or in part by peer nodes (such as those illustrated in FIG. 5) or from the central system 180 or by partner systems, such as an ad exchange or ad server.

Alternate or substitute advertisements and content may be selected based on configuration parameters, parity characteristics size, type, relevancy, interests, etc. For example, the selection may be performed so as to select replacement content of similar size and shape to an advertisement being overlaid, inserted or replaced, so as not to cause the reformatting of other portions of the user's page/content or otherwise adversely impact other portions of the user's page/content (e.g., to avoid the insertion of content causing article text adjacent to the inserted content to be only a few character wide and to avoid causing each word in the article to "break").

The user may or may not actually see the changed results as they may be hidden. For example, some of the content that may have been replaced may be an invisible inclusion and appears to the user and/or the original content sender as unaltered. For example, this may be accomplished by marking the corresponding tag's display attribute as hidden. By way of further example, the content media download may be halted or paused. By way of still further example, the corresponding content size attribute may be set to 0. Yet another example embodiment overlays content on top of original content. The altered content may include a user feature (e.g., a control displayed on the altered/replacement content, such as a toggle control, or accessed via a toolbar or menu) to unhide or restore the original content as desired for display to the user.

An example merchant system 150 includes software hosted on a computing device that enables content contributors and advertisers to register their profiles and content, which optionally may be distributed within the distributed system. It may also include interfaces to partner providers such as ad networks, ad servers, DSP, etc. The content may include renderable content, such as images, streamlining media, news feeds, blog text, textual content, links, program scripts, advertisements, other HTML and/or SGML data, etc. In addition to the renderable content, information may be stored related to the content attributes, such as size, format, and/or other reference data.

The client software 40 may be hosted on a device 20, associated with a user 15. The client software 40 may communicate over a network 90 (e.g., the Internet and/or other network) to a search entity 100 operating a search engine and/or Internet site 120 that provides search results 130 or other similar content provider or media including streaming media. The client software 40 may be configured to insert, replace or modify advertisements and/or search results, and render the results 30. A merchant, via a merchant terminal 150, can interact with the client software and/or the system 180 as described elsewhere herein.

As discussed in greater detail below, the user terminal 20 (e.g., via the client software 45) may obtain replacement content/advertisements from one or more other client nodes 92 and/or one or more proxy nodes 94 that may be operated by an enterprise. The client terminal 20 may receive, directly or indirectly, one or more replacement advertisements via ad network 96.

Figure 2A:
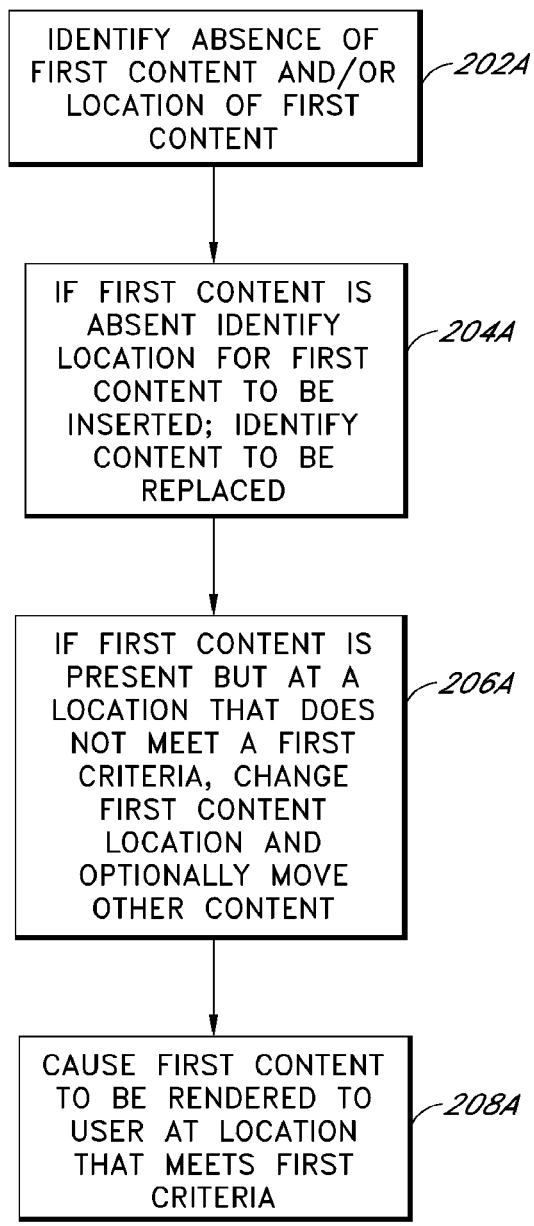
FIG. 2A illustrates an example process for inserting and/or improving the position of content.

FIG. 2A illustrates an example process for inserting and/or improving the position of certain content. For example, the content may include an advertisement and/or a listing (which may include a link to the merchant) that is or appears to be a search result listing. The process may be performed in whole or in part by the client software described herein, a proxy node, a peer node, or a central system.

At state 202A, data (e.g., Web page data) is received and parsed to determine whether a first content (e.g., an advertisement and/or a listing of a merchant or advertising partner that has subscribed to have improved visibility of their advertisements and/or search rankings) is either not present or is present but at a location that does not meet specified criteria (e.g., merchant specified criteria). For example, if the web page includes a search result listing from a search engine, and the listing includes a listing for the merchant, but the position/ranking of the merchant listing does not meet a position criteria (e.g., where the criteria specifies a specific position/ranking, such as the first listing, or a range, such as within the first 3 listings), the process will determine that the content is not a location/position that meets the criteria. The determination may be stored in memory and the position may be reordered for display to the user. Optionally, the process does not determine if the search result listing from a search engine includes the first content.

At state 204A, if the first content is absent, the process identifies a location for the first content. Optionally, this state is performed without determining with the first content is absent. The location may be selected based on merchant/advertiser specified criteria (e.g., content/advertisement is to be located as the first/top advertisement on page; or the content/listing is to be positioned as the first search result listing) and/or the amount of physical display space available on the page that is large enough/of the proper dimensions to hold the first content. If other content is at the identified location, the other content is identified to be replaced or moved.

At state 206A, if the first content was determined to be present at state 204A, but at a location that does not meet the first location criteria (such as the merchant specified criteria discussed above), the location of the first content is changed to a location that meets or more closely meets the first criterion or criteria (e.g., the advertisement is moved to the location as the top advertisement on page; or the content/listing is positioned as the first search result listing). If other content is at the new location, the other content is identified to be replaced or moved.

Optionally, even if the process does not determine if the first content is present in the original search listing, the process inserts the first content at the new location, so that the first content may be listed twice, at the original position (if the first content was in the original listing) and at the new position. Optionally, the process inserts the first content, or variations thereof (such as a related advertisement or related URL), at multiple locations in the search listing. Optionally the first content or related content of the merchant/advertiser is inserted in the search listing and in a targeted advertisement area (e.g., above and/or on the side of the search result listing). Optionally, the number and placement of such insertions may be based at least in part on a fee paid by the merchant advertiser, wherein different fees may be charged for different levels of service. For example, a first fee may be charged to have the first content inserted in a targeted advertisement area above the search results, a second fee may be charged to have the first content inserted in a targeted advertisement area on the side of the search results, and a third fee may be charged to have the first content included in the search results, wherein the first, second, and third fees may also be based on the positioning of the first content within the corresponding areas (e.g., the top listing fee may be more expensive than a third position fee). In certain embodiments a fee may be paid to have the first content inserted/placed in multiple areas.

At state 208A, the process causes the first content to be rendered (e.g., via a browser on a user terminal) at the location that meets the first criterion or criteria.

Figure 2B:
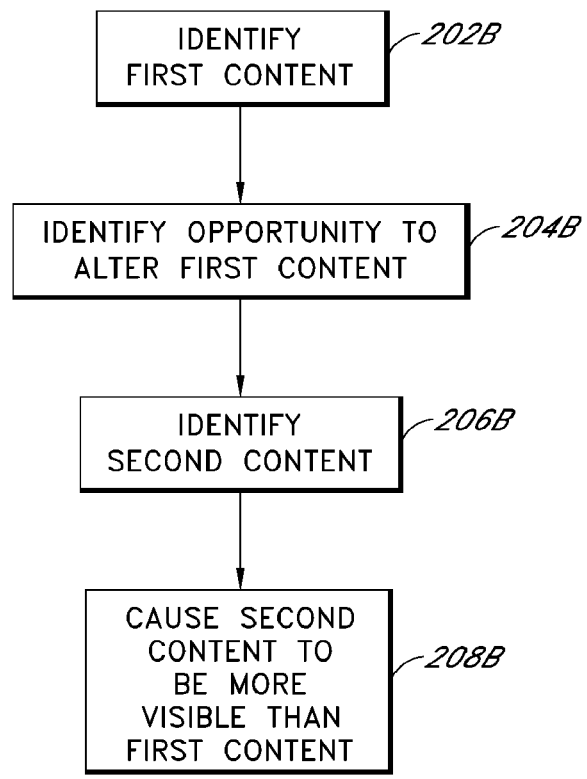
FIG. 2B illustrates an example process for inserting selecting and displaying content.
Figure 3:
Figure 3B:
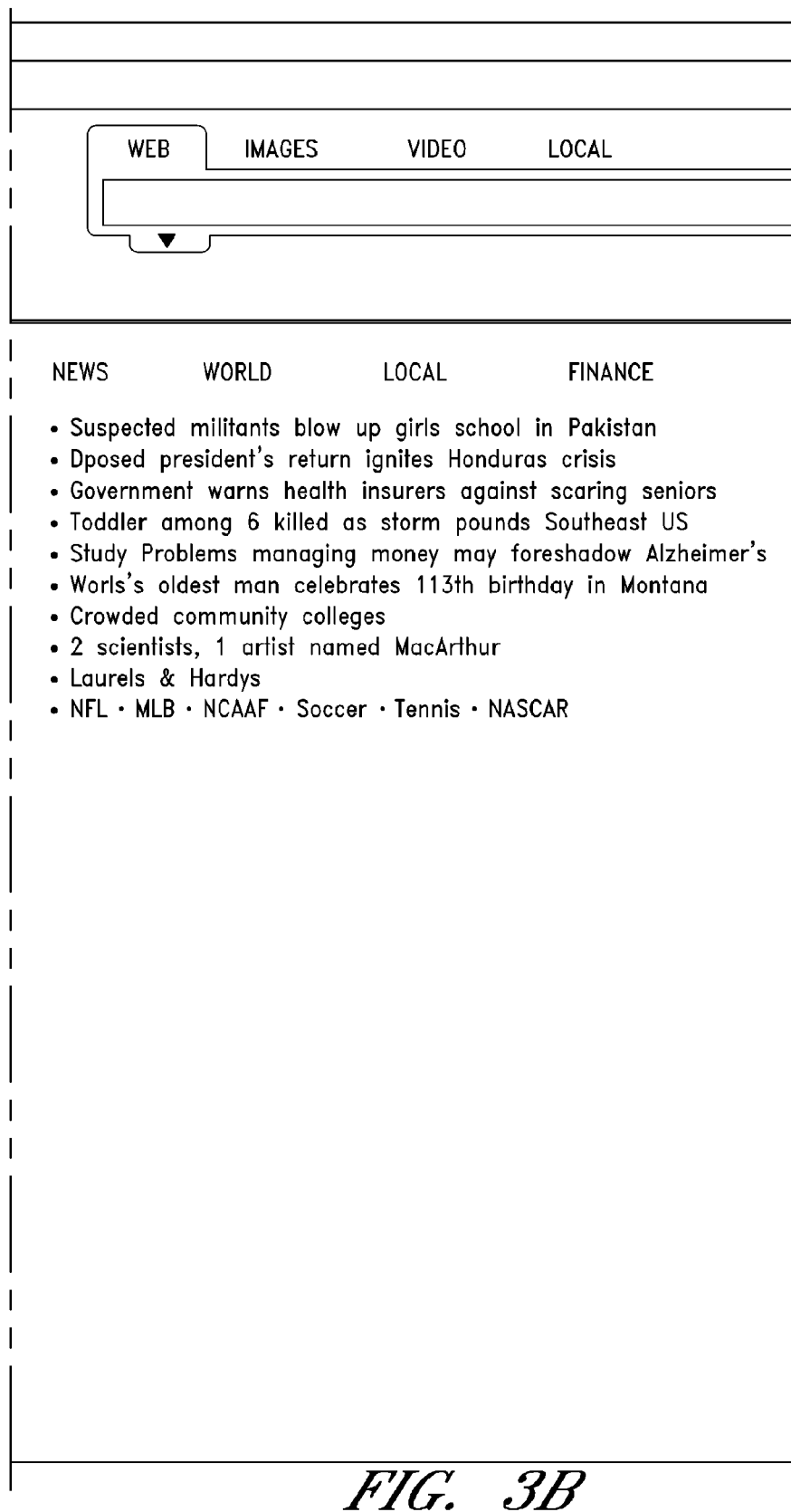
Figure 3C:
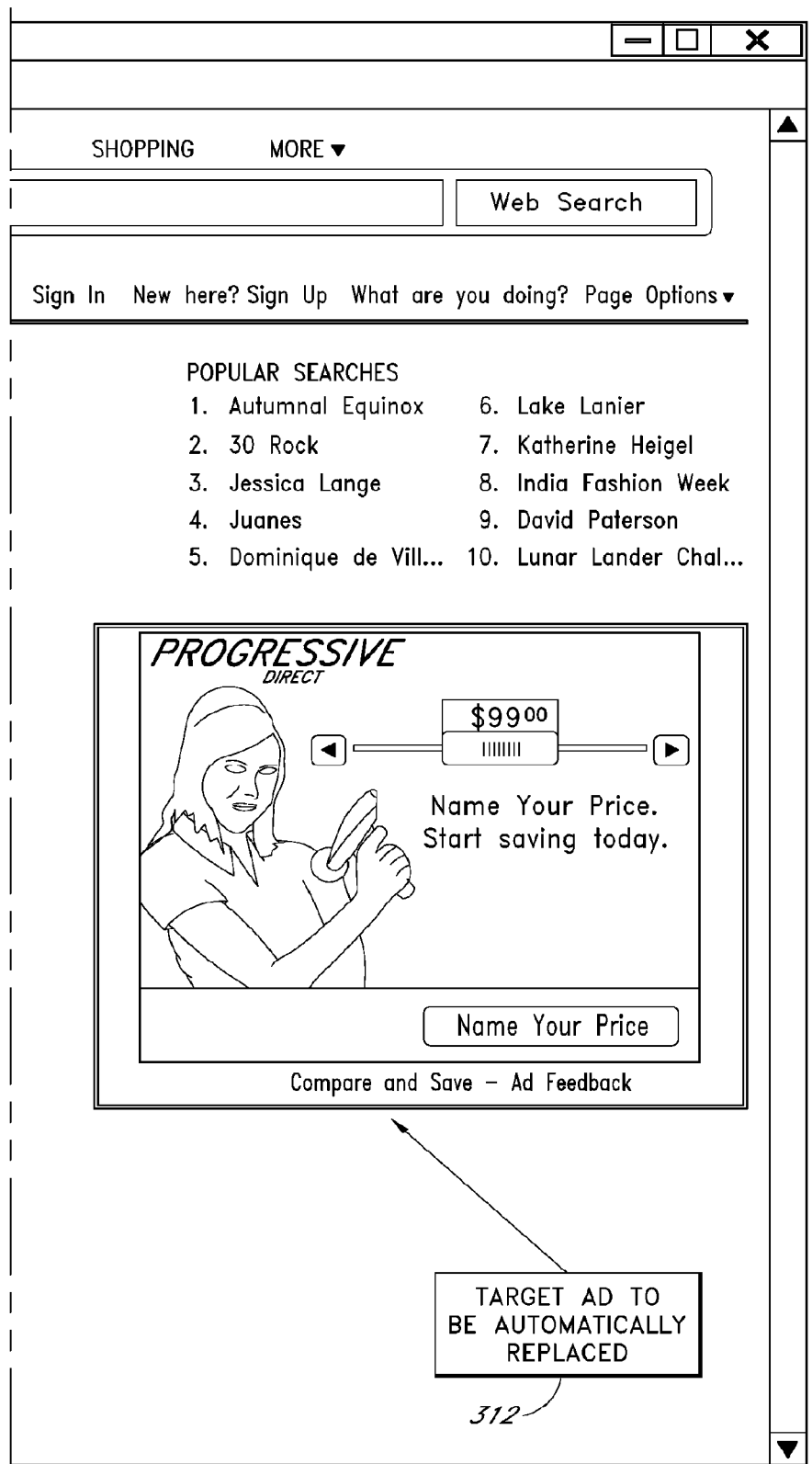
Figure 4:
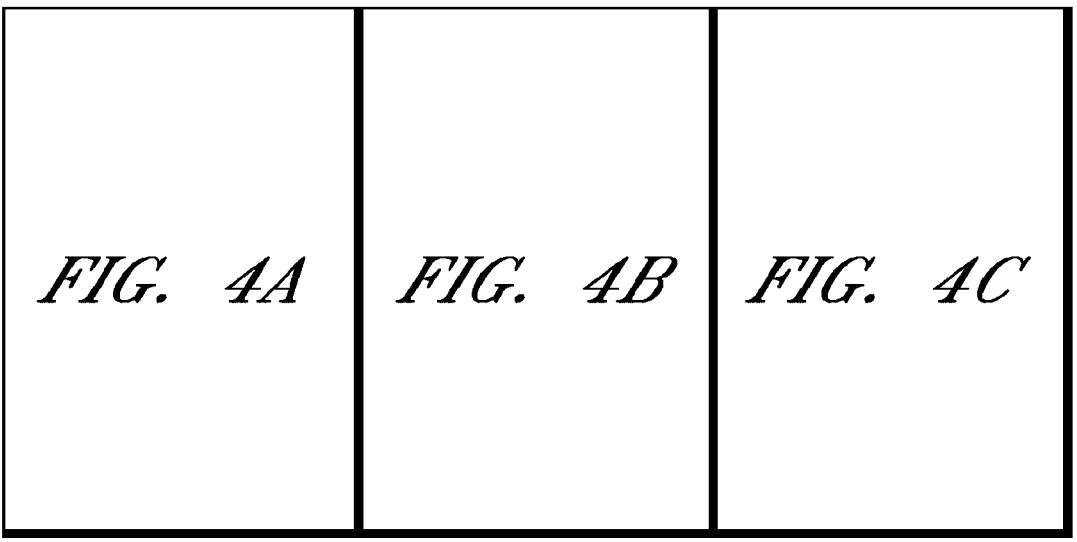
Figure 4B:
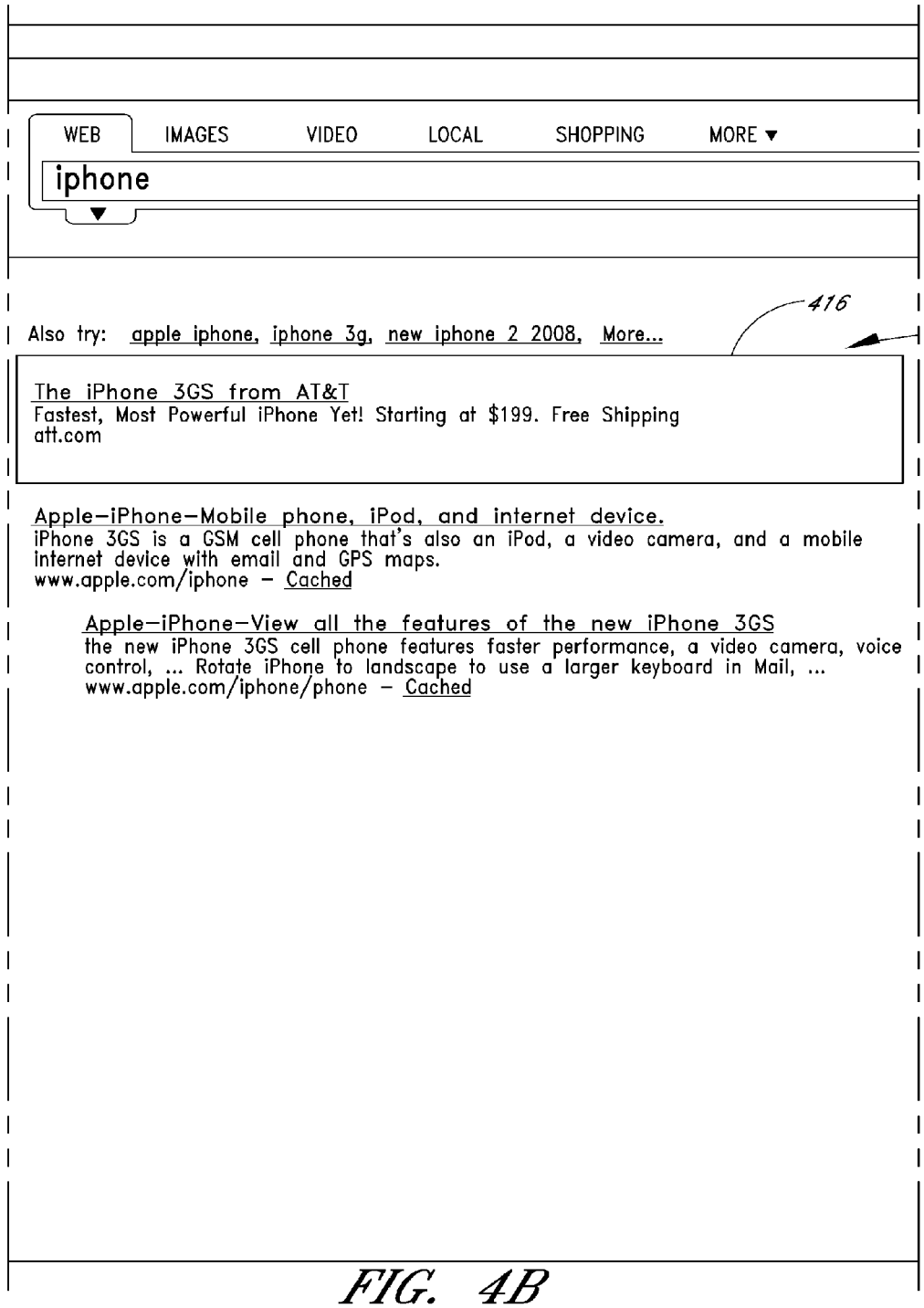
Figure 4C:
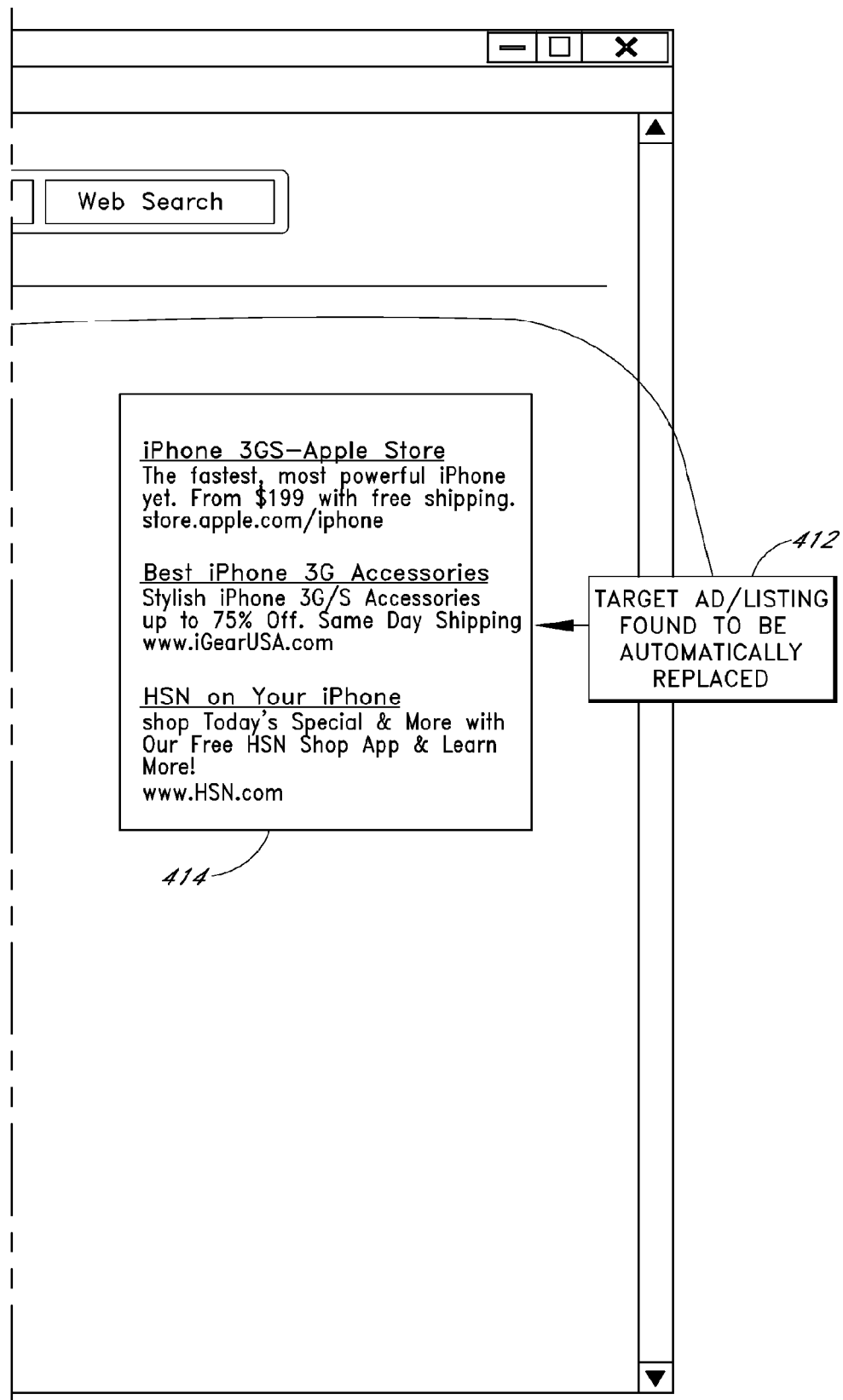

FIG. 2B illustrates an example process for inserting selecting and displaying content. The process may be performed in whole or in part by the client software described herein, a proxy node, a peer node, or a central system.

At state 202B, data (e.g., web page data) is received and parsed to identify one or more types of content (e.g., an advertisement and/or a listing of a merchant or advertising partner that has subscribed to have improved visibility of their advertisements and/or search rankings), referred to as first content, and parsed to identify the dimensions of such first content.

At state 204B, a determination is made as to whether there is an opportunity to alter the first content based on one or more criteria. At state 206B, second content is selected based on one or more criteria. For example, the criteria can include one or more of the following or any combination thereof:

a user search query;

a user profile (e.g., demographics and/or specified areas of interest);

advertiser specified criteria (e.g., desired demographics or interest of users to whom advertisements should be served; search terms, wherein if a user enters certain search terms in a search query, the advertiser's ads should be served to the user; payment of a placement fee by the advertiser, etc.).

At state 208B the second content is made more visible than the first content when the second content is displayed in the rendered web page. For example, the first content (or a link to the first content) may be removed entirely, and the second content may be displayed in substantially the same location that the first content was originally configured to be displayed at. By way of further example, the first content may be made invisible using certain attributes while the second content is made visible. By way of still further example, the second content may overlay the first content (e.g., by having the z-order attribute of the second content set to a higher order than the first content) so that the first content cannot be viewed.

Figure 6:
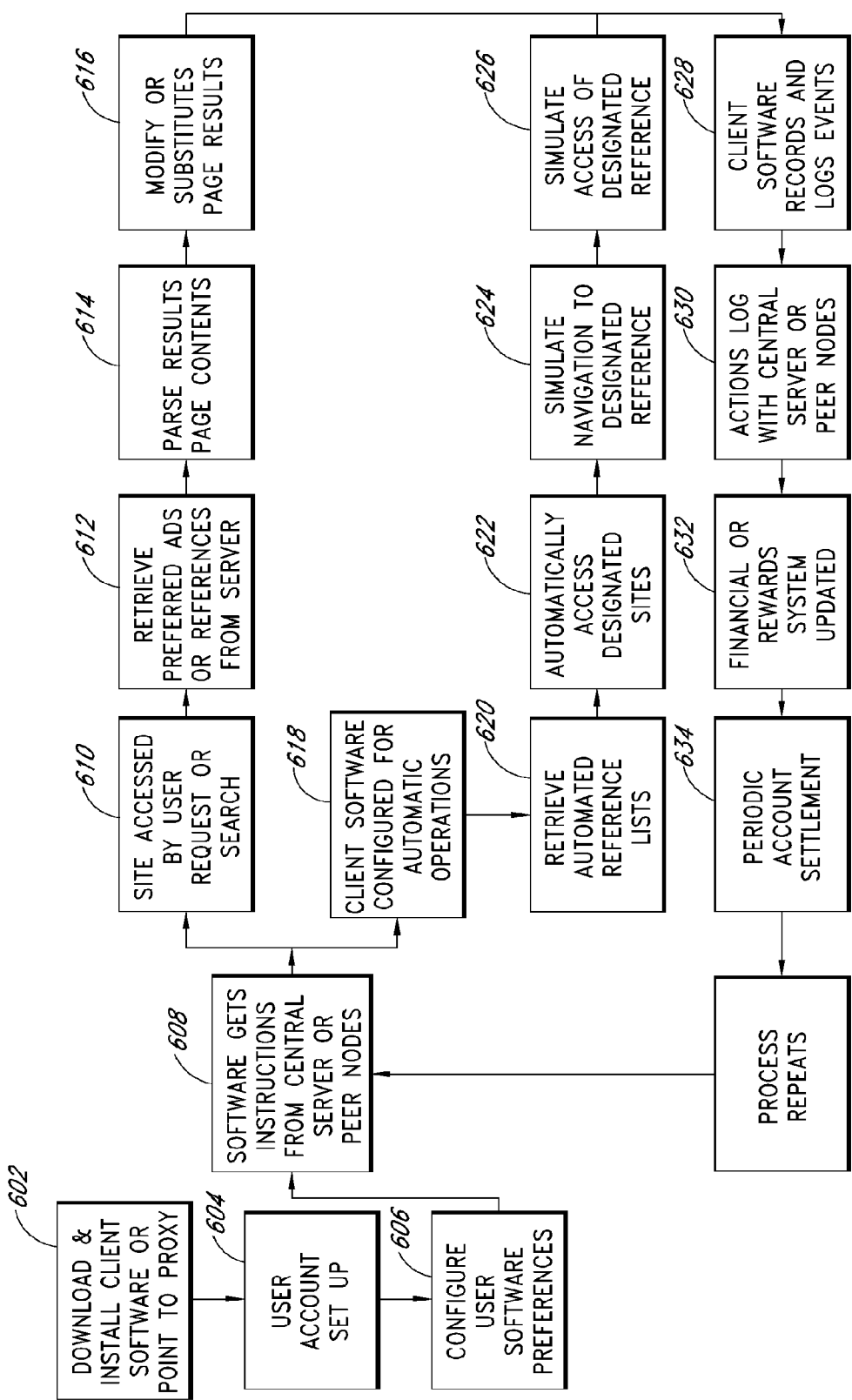
FIG. 6 illustrates an example processes for setting up and configuring client software.

FIG. 6 illustrates example features, workflow and functions performed by the client software. In one such example of this workflow, at state 602 the user obtains the client software and installs it on their computing device (e.g., a personal computer system). For the purpose of this example the software will be installed as a plug-in to an existing Internet browser but could optionally be installed to work with other programs, such as instant messaging programs, or independently. At state 604, the user may then establish an account with a central system, such as central system 180 illustrated in FIG. 1.

At state 606, the user may then configure particular parameters that affect the behavior of the client software such as scheduled times to execute, maximum usage of system resources, and other settings. At state 608, the client software communicates with a central system, such a central system 180 illustrated in FIG. 1, or other peer nodes for further instructions such as a list of reference sites to access (e.g., for use in passive mode where the client software automatically accesses the reference sites at one or more specified uniform resource locators (URLs) to simulate a user navigating to the sites), the frequency at which these sites may be accessed, the targeted internal references to be found at these sites and/or the simulated behavior when accessing the sites.

The client software, such as client software 40 illustrated in FIG. 1, may also be used to provide feedback data and beacon information to the central system or other peer nodes. This feedback data can include a batch list of instructions or individual instructions to be executed sequentially or in parallel by the central system. The client software may also receive a list of advertisements or content in whole or in part from peer nodes, the central system 180 or an external system that will be added to or substituted in one or more requested pages from these sites. Optionally, the content and/or communications may be encrypted.

At state 610, the user utilizes the client software (e.g., an existing browser enhanced by a plug-in or instructed to use a proxy node providing the functionality discussed herein) to submit a search query (e.g., for a topic such as "Concert Tickets" for a particular event) or to access a web site web page. At state 612, the search engine provides search results to the client software, or the web site accessed by the client software returns a web page. The returned search results or web page may include ads or merchant links within the search results and/or advertisements and links within the web page.

At state 614, the client software parses the content of the search results page or other web contents. For example, the client software may evaluate the search results page to determine whether a merchant link/entry (e.g., for a merchant whose has been designated to benefit from the advertisement enhancement services) is absent from the search results or the merchant link entry is listed with a priority/ranking/position lower than the merchant is designated to receive, and/or that advertisements for the same or different merchant are not displayed, provided for display, and/or readily visible of the web page served by the site.

Based at least in part on the evaluation performed at state 614, at state 616 the client software may modify the web page/search results to insert or substitute content, or to improve the positioning/ranking of a search result listing, to increase visibility for one or more merchants. By way of illustration, an advertisement for a merchant may be inserted in a list of sponsored advertisements, and a missing or hard to find reference link (e.g., hard to find because it has a relatively low positioning in the search results so that it will take navigations though several pages until the merchant reference link is accessed) may be inserted at the top of the list or at a higher position. Optionally, a subsequent background process may simulate the selection of the inserted link indicating to the search engine that the link was desired. These actions, processes and results may then be logged by the client software and communicated back to the central system (e.g., system 180 illustrated in FIG. 1) or to peer nodes. For example, some or all of the nodes can log the processes and results so the value of the processes described herein can be reported to one or more recipients (e.g., advertisers) and to enable funds/rewards to be distributed appropriately. This process may be repeated for the same or different instructions.

If the client software is configured for automatic operation, the process proceeds from state 608 to state 618. When performing in automatic mode, the client software may behave in a similar ways as discussed above with respect to states 610-620, but without user interaction or with a reduced amount user interaction and with or without displaying requested web page or search results that are automatically requested. By way of illustration, when the user is not actively utilizing the host system or the user is executing other software (e.g., financial software, a word processor, an Internet browser, an email client, etc.), the client software may optionally execute instructions and tasks as similarly discussed above.

For example, at state 620, the client application receives (via a pull operation (e.g., via a client application request) or via a push operation from remote system, such as the central system of a proxy node) a list of one or more sites/URLs. At states 622, 624, 626 the client software optionally automatically navigates to and issues a URL/web page request or a user search query to a particular site from the list received, emulating a user request/search. Although the page(s) received via the automated request are optionally not rendered and the user does not see the pages, the client software optionally evaluates the resulting pages and may optionally modify, insert, remove or substitute content from the resulting page (whether or not rendered), and based on the instruction set my simulate further actions on the modified page or via a direct link request to the sites enumerated by the instruction set.

For both the manual process of states 610-616 and the automatic process of states 620-626, the process proceeds to state 628, and the client software records and logs the activities performed by the client application (e.g., a record of the sites accessed, the advertisements modified/replaced, etc.). At state 630, the process forwards some or all of the logged events to the central system and/or one or more proxy nodes. At state 632, a system (e.g., a financial or rewards system, which may be the central system), updates the user's account information to reflect and benefits the user is to receive (financial or otherwise) as a result of the advertisement replacement/modification processes performed at the foregoing states. At state 634, account settlement is performed (e.g., periodically, such as monthly), wherein the user is paid fees for participating in the services.

With respect to merchants, a merchant participating or that want to participate in the advertisement replacement/listing modification process may register with the system. A new merchant may, and optionally is required to enter profile data, financial information and/or configuration parameters for use by the system in managing the distribution of content and advertisement. A merchant may also include references to other data already existing with respect to certain websites, where the user wants to improve the visibility and ranking of such data on other sites. For example, a merchant may have their own web site or web presence and pay for advertisements and listings to be displayed with other respect to the sites/web pages of other website of other companies to provide better visibility and availability of the merchant's information. As described herein, the system may employ the client software nodes to augment or enhance the visibility and ranking of a particular merchants existing content.

By way of an illustrative example, a merchant site may rank poorly because the site owner has not paid to increase its ranking or visibility on a given search engine. Once the merchant registers with central system or otherwise is entitled to the advertisement/site ranking processes described herein (e.g., by registering with another authorized entity), the client application hosted on one or more terminals of one or more users may be instructed to simulate a user by automatically searching and selecting or "clicking" on the merchant's site and/or links therein, thereby increasing the apparent random popularity of the site and resulting in improved ranking of the merchants existing site within an independent search engine company. This same or similar technique can be used to affect the frequency and/or placement of merchant or competitor advertisements.

In an example embodiment, a system (e.g., a central server) stores global information, including system-wide activities, regarding the system. The system may also deliver configuration and command logic to the client software nodes, which supplements or augments user configuration data. The central system may be configured to send and receive synchronous and/or asynchronous information over the Internet or other network to client software nodes, and performs data aggregation for the network. However, optionally, one or more client software nodes can operate independently with little or potentially no communication with the central system. Thus, even if the central system/server is temporarily unable to communicate with the client software nodes, the client software nodes can still perform some or all of the functions (e.g., advertisement substitution, ranking modification, etc.).

The central system may store merchant registration information, including some or all of the following: method of payment, authorization of payment, and services purchased (e.g., ad replacement services, ad modification services, ranking improvement services, etc.). Merchant data may also include data relating to the creation and formatting of customized text, images and/or other media. The merchant may select or enter particular words, word associations or other data of interest and relate these selections to the included text, formatting and media, which are stored and communicated via the central system, peer nodes, and/or proxy nodes to one or more client software nodes.

The central system also may include an advertisement system and/or an interface to one or more advertising partners, such as described elsewhere herein, that enable merchants to promote advertiser content, text and/or media. The advertising system may utilize some or all of client software nodes to command, monitor, record and/or enhance the advertisement process.

The central system also may include a payment and reporting system such that transaction and services may be recorded using data from the central system, one or more proxy nodes, and/or one or more client software nodes. The payment system is optionally configured to manage the distribution of fees and proceeds to various participants based on configurable parameters and level of participation. For example, the merchant may configure a payment structure for services, wherein some or all of the merchants service payments are distributed to users based on their client software configuration and level of participation (e.g., the amount of demographic data provided, the number of searches performed using the client software, the number of times the merchant's advertisements have been displayed to the user, etc.).

Figure 7:
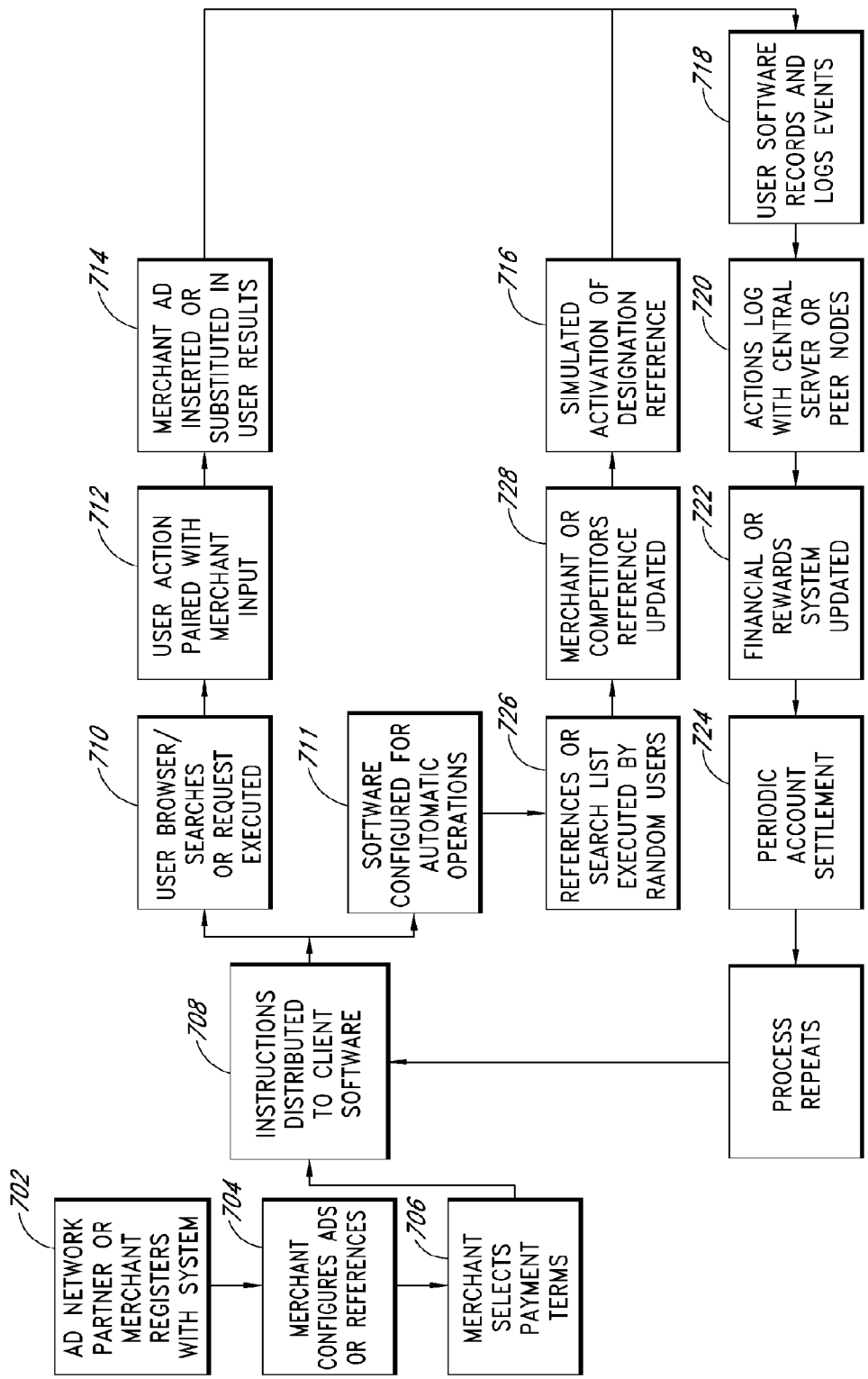
FIG. 7 illustrates an example process with respect to merchant interaction and components of a distributed search engine and content distribution system.

FIG. 7 is an example workflow process performed by a merchant system, which may be included as a component of the distributed search engine and content distribution system described herein. For the purpose of describing the example workflow described by FIG. 7, the merchant system will be considered to be a hosted application with Internet web pages presenting the user interface(s). In this example, at state 702, a merchant enrolls with the system by providing data such as contact and financial data needed to identify and bill the merchant, and such information is stored in merchant system memory. The merchant system may optionally request or require the input of security information, profile information, regulatory information and or/other information.

At state 704, the merchant system interface may request and store data from the merchant such as some or all of the following: target Internet sites, reference links, keywords, Uniform Resource Locator (URLs), advertisement text, advertisement graphics, active media, (e.g., FLASH media), streaming media (e.g., real time video media), and/or other data. At state 706, the merchant selects payment terms (e.g., a flat monthly fee, a performance based fee based on improvements in search result rankings and/or advertisement placements) for the services being provided via the distributed search engine and content distribution system.

At state 708, the received data and/or other data may be used to generate instructions for one or more instantiations of client software on one or more hosts, and optionally to search sites, identify content or results, evaluate page or link information, modify results, or to perform other actions or behaviors within the system or through the client software. With respect to actual user searches or requests, at state 710 a user provides a search query to a search engine (e.g., a third party search engine) or a URL that corresponds to a search (e.g., a URL that corresponds to a search result, such might be forwarded from one user that performed a search to another user). At state 712, the central system and/or peers determine which merchant is to be provided with an enhanced ranking and/or advertisement placement on the requesting user node based on the user characteristics (e.g., demographics) and/or the merchant profile. For example, the process may identify which advertisers' profile (which may profile the advertising merchant and/or the desired viewers) that more or most closely matches a give user's profile.

At state 714, the identified merchant's advertisements are inserted into the web page provided to the user (optionally replacing an existing advertisement or other content) as a result of the user request/query and/or the merchant's ranking in search results returned by the third party search engine is modified/improved.

With respect to automatic mode, where client applications simulate user requests/search queries, the process proceeds to state 711. At state 712, the instructions are issued to one or a plurality of client applications to cause the client applications to execute one or more reference or search lists (as similarly described above) optionally in a manner configured to simulate random user requests/search queries. At state 714, references in returned pages to the merchant and/or competitors are identified. At 716, one or more client applications simulate a user activation of the referenced links (e.g., associated with the merchant).

At state 718, the client software of the client nodes records and logs the activities performed by the respective client software (e.g., a record of the sites accessed, the advertisements modified/replaced, etc.). At state 720, the process forwards some or all of the logged events to the central system and/or one or more proxy nodes. At state 722, a system (e.g., a financial or rewards system, which may be the central system), updates the users' account information to reflect and benefits the users are to receive (financial or otherwise) as a result of the advertisement replacement/modification processes performed at the foregoing states and/or update merchant account information to accordingly bill the merchant. At state 724, the merchant is charged for the services provided via the distributed search engine and content distribution system.

The merchant system may store activity results of the system and the client software nodes. This stored data and other data may be used to create reports, calculate billings, optimize node inter-communications and pathways, or determine other compensation or rewards.

Thus, FIG. 7 illustrates certain features and functions of an example system and interactions with merchants and client software nodes.

Referring now in detail to FIGS. 1 and 5, a process stream is illustrated whereby users 10 may connect to a registration system 190, payment system 192, ad engine 194, reporting system 196, central system 180, and other peer nodes and/or proxy nodes. It should be noted that the components of the system 180 may be hosted on a single computer system or the components may be hosted on a plurality of computer systems which may be geography distributed over a large area and over many systems. Either directly or through the use of the client software 40 a user registers with the central system 180 and configures elements of the software to run interactively or automatically from the user's device 20, or the system can configure the elements of the software.

For example, a user may configure the client software to focus content based on user specified interests, demographics, and/or other data. Merchants may also connect to the central system 180 and enter registration information in the registration system 190 and the payment system 192. The payment system 192 optionally provides for a shared payment and reward methodology that are based on system parameters and participation.

The merchants can configure the ad engine 194 with desired representation media or reference information which is tracked within the reporting system 196. The client software, peer node, or proxy node 40 retrieves information from the central system 180 or other peer or proxy nodes, and actively and/or passively makes requests to the third party search engine 100 or other Internet sites based on rules configured between the client software 40, other peer nodes, other proxy nodes and central system 180. These requests may be used to perform one or more of the following:

1) increase the search frequency of a desired reference;
2) record the order of a particular reference within a search results;
3) monitor and report the relative prioritization of a particular reference within a search results;
4) reorder or transform in some way the search results or content in a way to improve the score or visibility of a specific reference, most likely desired by a merchant;
5) communicate between the distributed system elements information and data to optimize the delivery network.
6) alter web page content based at least in part on client software configuration.

The system 180 may be connected via an interface 181 to a user bank or other financial site 198 in order to make deposits of fees being paid to the user 15 for participating in processes described herein. The system 180 may be connected to a merchant bank or other financial site 199 in order to make withdrawals/charges for services rendered to the merchant and/or to made deposits. The system 180 may also be connected to one or more partners 98.

Optionally, certain embodiments can be utilized by an enterprise, such as an employer, merchant, vehicle operator, or venue operator to filter out certain advertisements on incoming pages directed to terminals (e.g., employee, customer, and/or visitor terminals, which will be referred to as "member terminals"), and replace those advertisements with enterprise selected content (or content selected by an entity, such as a partner of the enterprise, that has been authorized to select content by the enterprise) retrieved from an server (e.g., an enterprise or partner server). For example, the enterprise/partner content may include announcements regarding the enterprise, such as new product information, employee/customer/visitor events, employee benefit information, etc. Optionally, the enterprise can contract with an ad broker or other entity, to serve advertisements (e.g., of the enterprise or a partner) to the member terminals, optionally in exchange for benefits (such as those described above with respect to users) provided to the enterprise. The amount and/or type of benefits may be based on the participation of employees/customers/visitors as similarly described above with respect to users.

Optionally, certain embodiments can be utilized by a user to replace advertisements on incoming pages to a user terminal with user selected content, such as user photographs, videos, or other content. The user content may be accessed from the user terminal's memory, or via the user terminal from another system's data store or system node.

Unlike conventional centralized portal systems offered by typical search engine operators, an example embodiment of the system described herein optionally employs a distributed architecture with user-configured software nodes that enhance the relationship between merchants and users to shift the content provider and search engine value paradigm.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software may depend upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing a document comprising:
   receiving, by a computing device from a remote system in response to a request from a user terminal, data for a first document, wherein the first document is to be displayed on the user terminal;
   causing, by the computing device, at least in part, an automatic identification of a first content in the first document data, the first content associated with a first content provider and having a page structure;
   determining, by the computing device, whether the first content provider has authorized placement of the first content in the first document;
   modifying, by the computing device, in response to a determination that the first content provider has authorized placement of the first content in the first document, the page structure of the first content in the first document to permit the first content to be displayed in the first document on the user terminal, wherein the modifying, comprises recognizing, in the first document data, a randomized link name or a randomized tag name; transmitting a post back request to the recognized randomized link name or the recognized randomized tag name;
   parsing the post back request to identify a source element name associated with
   the recognized randomized link name or the recognized randomized tag name;
   recording the parsed post back request; and
   associating the recognized randomized link name or the recognized randomized
   tag name with the identified source element name resulting in randomized patterns related to content modification that are difficult to be detected; and
   modifying, in response to a determination that the first content provider has not authorized placement of the first content in the first document, the page structure of the first content in the first document to prevent the first content from being displayed in the first document on the user terminal, wherein the, comprises recognizing, in the first document data, a randomized link name or a randomized tag name; transmitting a post back request to the recognized randomized link name or the recognized randomized tag name;
   parsing the post back request to identify a source element name associated with
   the recognized randomized link name or the recognized randomized tag name;
   recording the parsed post back request; and
   associating the recognized randomized link name or the recognized randomized
   tag name with the identified source element name resulting in randomized patterns related to content modification that are difficult to be detected.

2. The method of claim 1, wherein the causing, by the computing device, at least in part, an automatic identification of a first content in the first document data comprises:
   associating the recognized randomized link name or the recognized randomized
   tag name with the identified source element name by creating a counter-solution to the randomized link name or randomized tag name.

3. The method of claim 1, wherein the causing, by the computing device, at
least in part, an automatic identification of a first content in the first document data includes at
least one of:
   recognizing meta data;
   recognizing a referring network resource reference;
   recognizing an embedded network resource reference;
   recognizing a scripting code tag;
   recognizing a uniform resource locator (URL) code;
   unmasking a randomized link name;
   unmasking a randomized tag name;
   recognizing a standard generalized markup language (SGML) tag;
   recognizing a hypertext markup language (HTML) tag;
   recognizing a template mask;
   recognizing a page handler algorithm;
   parsing a document object model (DOM) structure;
   tagging content;
   performing a string search to identify a word or phrase associated with general
   content or with specific content;
   performing a string search to identify a specific URL code; and
   performing a context index search.

4. The method of claim 1, wherein the modifying, by the computing device, in response to a determination that the first content provider has authorized placement of the first content in the first document, the page structure of the first content in the first document, wherein the modifying is performed in a manner that appears to be random and seems to be independent relative to modifications of the first document for display on other user terminals, resulting in patterns related to content modification that are difficult to be detected further comprises at least one of:
   randomizing a link name;
   randomizing a tag name;
   placing a referring network resource reference;
   embedding a network resource reference;
   placing meta data;
   placing a scripting code tag;
   placing a uniform resource locator (URL) code;
   placing a standard generalized markup language (SGML) tag;

placing a hypertext markup language (HTML) tag;
placing a template mask;
placing a page handler algorithm; and
modifying a document object model (DOM) structure.

5. The method of claim 1, wherein the modifying, in response to a
determination that the first content provider has not authorized placement of the first content in the first document, the page structure of the first content in the first document to prevent the first content from being displayed in the first document on the user terminal includes providing, by the computing device, a control by which the first content can be displayed in the first document on the user terminal.

6. The method of claim 1, further comprising providing, by the computing device, an incentive to consent to alter content provided by one or more network content providers.

7. The method of claim 1, wherein the computing device is:
a user peer node with respect to the user terminal; or
a client node with respect to the user terminal; or
the user terminal; or
a network appliance.

8. A method of processing a document comprising:
receiving, by a computing device from a remote system in response to a request from a user terminal, data for a first document, wherein the first document is to be displayed on the user terminal;
causing, by the computing device, at least in part, an automatic identification of a first content in the first document data, the first content associated with a first content provider and having a page structure;
determining, by the computing device, whether the first content provider has authorized placement of the first content in the first document;
modifying, by the computing device, in response to a determination that the first content provider has authorized placement of the first content in the first document, the page structure of the first content in the first document to permit the first content to be displayed in the first document on the user terminal, wherein the modifying, comprises recognizing, in the first document data, a randomized link name or a randomized tag name; transmitting a post back request to the recognized randomized link name or the recognized randomized tag name;
parsing the post back request to identify a source element name associated with
the recognized randomized link name or the recognized randomized tag name;
recording the parsed post back request; and
associating the recognized randomized link name or the recognized randomized
tag name with the identified source element name resulting in randomized patterns related to content modification that are difficult to be detected; and
modifying, in response to a determination that the first content provider has not authorized placement of the first content in the first document, the page structure of the first content in the first document to prevent the first content from being displayed in the first document on the user terminal, wherein the modifying, comprises recognizing, in the first document data, a randomized link name or a randomized tag name; transmitting a post back request to the recognized randomized link name or the recognized randomized tag name;
parsing the post back request to identify a source element name associated with
the recognized randomized link name or the recognized randomized tag name;
recording the parsed post back request; and
associating the recognized randomized link name or the recognized randomized tag name with the identified source element name resulting in randomized patterns related to content modification that are difficult to be detected, the modifying further comprising:
causing, in the computing device, at least in part, a second content to be
selected based at least in part on information accessed from a memory device, wherein the information accessed from the memory device is associated with a second content provider associated with the second content, wherein the second content provider has authorized placement of the second content in the first document, and wherein the information accessed from the memory device is associated with user-related information;
outputting, by the computing device, the first document to a display associated with the user terminal; and
causing, by the computing device, to be displayed on the user terminal, at least in part, the first content to be obscured by the second content, so that if the first document is displayed on the user terminal, the second content is displayed on the user terminal and the first content is not visible.

9. The method of claim 8, wherein the causing, by the computing device, at least in part, an automatic identification of a first content in the first document data comprises:
associating the recognized randomized link name or the recognized randomized tag name with the identified source element name by creating a counter-solution to the randomized link name or randomized tag name.

10. The method of claim 8, wherein the causing, by the computing device, at
least in part, an automatic identification of a first content in the first document data includes at
least one of:
recognizing meta data;
recognizing a referring network resource reference;
recognizing an embedded network resource reference;
recognizing a scripting code tag;
recognizing a uniform resource locator (URL) code;
unmasking a randomized link name;
unmasking a randomized tag name;
recognizing a standard generalized markup language (SGML) tag;
recognizing a hypertext markup language (HTML) tag;
recognizing a template mask;
recognizing a page handler algorithm;
parsing a document object model (DOM) structure;
tagging content;
performing a string search to identify a word or phrase associated with general
content or with specific content;
performing a string search to identify a specific URL code; and
performing a context index search.

11. The method of claim 8, wherein the information accessed from the
memory device associated with user-related information includes:
a type or source of content to target for overlay;
a control to specify whether the first content is to be hidden, overlaid, or replaced;

a control to specify whether the second content, displayed on the user terminal, is
to be identified as content that has obscured the first content;
a type or source of content that are of interest;
demographic information, including:
gender;
marital status;
birth year;
birth month; and
highest level of education; and
a list of proxy settings.

12. The method of claim 8, wherein the causing, by the computing device, to
be displayed on the user terminal, at least in part, the first content to be obscured by the second
content, so that if the first document is displayed on the user terminal, the second content is
displayed on the user terminal and the first content is not visible further comprises at least one of:
removing the first content;
inserting the second content;
overlaying the first content with the second content;
muting audio associated with the first content;
rendering the second content; and
reformatting the second content.

13. The method of claim 8, further comprising causing, by the computing device, at least in part, a deposit or a credit to be made into a user account at least partly in response to the first content being obscured by the second content.

14. The method of claim 8, wherein the causing, by the computing device, to be displayed on the user terminal, at least in part, the first content to be obscured by the second content, so that if the first document is displayed on the user terminal, the second content is displayed on the user terminal and the first content is not visible, further includes wherein a first portion of the second content is received from a first peer node, a second portion of the second content is received from a second peer node, and the first and second portions of the second content are combined, by the computing device, to form the second content.

15. The method of claim 8, further comprising selecting the second content from a replacement content system, wherein the replacement content system is a remote server, or a proxy node, or a network appliance, wherein the replacement content system is used to layer the second content, and wherein the layered second content is selected and/or sized to have dimensions substantially the same as dimensions of the first content.

16. The method of claim 8, wherein the causing, by the computing device, to be displayed on the user terminal, at least in part, the first content to be obscured by the second content, so that if the first document is displayed on the user terminal, the second content is displayed on the user terminal and the first content is not visible, further includes wherein:
the first content and the second content are HTML codes; and
a z-order attribute of the second content is set to a higher order than a z-order attribute of the first content so that the second content will be layered above the first content such that the first content is obscured by the second content.

17. The method of claim 8, wherein the causing, by the computing device, to be displayed on the user terminal, at least in part, the first content to be obscured by the second content, so that if the first document is displayed on the user terminal, the second content is displayed on the user terminal and the first content is not visible, further includes wherein:
the first content has a first invisible attribute;
the second content has a second invisible attribute; and
the first invisible attribute is set to cause the first content to not be visible and the second invisible attribute is set to cause the second content to be visible.

18. The method of claim 8, further comprising identifying a shape and size associated with the first content, wherein the causing, in the computing device, at least in part, a second content to be selected based at least in part on information accessed from a memory device, is further based on the identified shape and size of the first content.

19. The method of claim 8, wherein the computing device is:
a user peer node with respect to the user terminal; or
a client node with respect to the user terminal; or
the user terminal; or
a network appliance.

* * * * *